(12) United States Patent
Ohmori et al.

(10) Patent No.: US 8,617,769 B2
(45) Date of Patent: *Dec. 31, 2013

(54) COATING BODY

(75) Inventors: Makoto Ohmori, Nagoya (JP); Takashi Ryu, Nagoya (JP); Toshiyuki Nakamura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 443 days.

This patent is subject to a terminal disclaimer.

(21) Appl. No.: 12/909,907

(22) Filed: Oct. 22, 2010

(65) Prior Publication Data

US 2011/0111327 A1    May 12, 2011

(30) Foreign Application Priority Data

Nov. 9, 2009   (JP) ................................. 2009-256574

(51) Int. Cl.
  *H01M 4/64*   (2006.01)
  *B32B 15/04*   (2006.01)
  *B32B 7/02*   (2006.01)

(52) U.S. Cl.
  USPC ........... 429/520; 429/517; 428/629; 428/216; 428/552

(58) Field of Classification Search
  USPC .......... 429/517, 518, 519, 520, 522; 428/216, 428/552, 629
  See application file for complete search history.

(56) References Cited

U.S. PATENT DOCUMENTS

| | | | |
|---|---|---|---|
| 5,942,349 A | 8/1999 | Badwal et al. | |
| 2004/0247978 A1 | 12/2004 | Shimamune | |
| 2009/0155666 A1 | 6/2009 | Kiefer et al. | |
| 2010/0108953 A1 | 5/2010 | Kusnezoff et al. | |
| 2010/0119886 A1* | 5/2010 | Nielsen et al. | 429/13 |

FOREIGN PATENT DOCUMENTS

| | | |
|---|---|---|
| DE | 10 2005 015755 A1 | 10/2006 |
| EP | 2 223 897 A1 | 9/2010 |
| EP | 2 224 516 A1 | 9/2010 |
| GB | 2 305 169 A1 | 4/1997 |
| JP | 64-041172 A1 | 2/1989 |
| JP | 11-501764 A1 | 2/1999 |
| JP | 2005-339904 A1 | 12/2005 |
| WO | 03/026052 A1 | 3/2003 |
| WO | 2008/125103 A2 | 10/2008 |

OTHER PUBLICATIONS

AK Steel. Product Data Sheet 430 Stainless Steel, 2007.*
Japanese Office Action dated Nov. 29, 2011 (with partial English translation).

(Continued)

*Primary Examiner* — Carlos Barcena
(74) *Attorney, Agent, or Firm* — Burr & Brown, PLLC

(57) ABSTRACT

Powders of respective metal elements (Mn, Co) constituting a transition metal oxide ($MnCo_2O_4$) having a spinel type crystal structure are used as a starting material of the coating film. A film of a paste containing the mixture of the powders is formed on the surface of the interconnector, and with this state, the paste is sintered to form the coating film. In the coating body, a chromia layer including $Cr_2O_3$, a first layer including elements of Mn, Co, Fe, Cr, and O, and a second layer including elements of Mn, Co, Fe, and O are provided in this order from the side close to the interconnector at the boundary between the coating film and the interconnector. With this structure, the coating film is difficult to be peeled even if the coating body is placed in a severe temperature change.

7 Claims, 22 Drawing Sheets

(56) References Cited

OTHER PUBLICATIONS

P. Wei, et al., "*Oxidation and Electrical Conductivity Behavior of Spinel Coatings for Metallic Interconnects of Solid Oxide Fuel Cells*," Corrosion, vol. 63, No. 6, Jun. 1, 2007, pp. 529-536.

Junwei Wu, et al., "*The Performance of Solid Oxide Fuel Cells with Mn—Co Electroplated Interconnect as Cathode Current Collector*," Journal of Power Sources, vol. 189, No. 2, Apr. 15, 2009, pp. 1106-1113.

Teruhisa Horita, et al., "*Diffusion of Oxygen in the Scales of Fe—Cr Alloy Interconnects and Oxide Coating Layer for Solid Oxide Fuel Cells*," Solid State Ionics, vol. 179, No. 38, Nov. 30, 2008, pp. 2216-2221.

\* cited by examiner

COATING BODY

BACKGROUND OF THE INVENTION

1. Field of the Invention

The present invention relates to a coating body having a conductive member that is covered by a coating film on its surface.

2. Description of the Related Art

A cell (single cell) of a solid oxide fuel cell (SOFC) includes a solid electrolyte, a fuel electrode formed integral with the solid electrolyte, and an air electrode formed integral with the solid electrolyte. A fuel gas (hydrogen gas, etc.) is supplied to the fuel electrode of the SOFC cell and a gas (air, etc.) containing oxygen is supplied to the air electrode of the SOFC cell, whereby a chemical reaction represented by Formulas (1) and (2) described below is generated. Thus, a potential difference is produced between the fuel electrode and the air electrode.

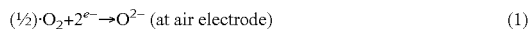
$$(1/2)\cdot O_2 + 2e^- \rightarrow O^{2-} \text{ (at air electrode)} \qquad (1)$$

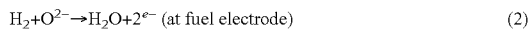
$$H_2 + O^{2-} \rightarrow H_2O + 2e^- \text{ (at fuel electrode)} \qquad (2)$$

In the SOFC, a conductive connection member (hereinafter referred to as interconnector) for collecting electric current is bonded and fixed to each of the fuel electrode and the air electrode with a bonding agent. Power based upon the potential difference is taken out to the outside through the respective interconnectors. Attention is particularly focused on the bonding between the air electrode and the interconnector below.

An expensive Pt material has conventionally been used as the bonding agent to bond the air electrode and the interconnector so as to electrically connect the air electrode and the interconnector. A silver material from a metal and a conductive ceramic material from a ceramic are considered as a substitute material for the Pt material in order to reduce cost. For example, Japanese Unexamined Patent Application No. 2005-339904 discloses La—Sr—Co—Fe perovskite complex material as a conductive ceramic material for fixedly bonding the air electrode and the interconnector.

SUMMARY OF THE INVENTION

A ferritic stainless steel (ferritic SUS material) containing Fe and Cr is generally used as the material for the interconnector at the side of the air electrode. In this case, a phenomenon occurs in which Cr is discharged from the surface of the SUS material during the operation of the SFOC (i.e., under high-temperature atmosphere (e.g., 800° C.), and the discharged Cr is diffused around the SUS material. This phenomenon is referred to as "Cr diffusion" below.

When Cr diffused by the Cr diffusion is deposited on the surface of the air electrode, the surface area of the air electrode, which can contribute to the reaction at the air electrode represented by the above-mentioned formula (1), is reduced, whereby the reaction speed can be decreased. As a result, there arise problems (so-called Cr poisoning) of the reduction in the output density of the SOFC, and the like. It is necessary to suppress the Cr diffusion in order to suppress the degree of the "Cr poisoning of the air electrode". It is considered that the surface of the SUS material is covered by a coating film in order to suppress the Cr diffusion.

The present inventor has focused an attention on a transition metal oxide (e.g., $MnCo_2O_4$, $CuMn_2O_4$) having a spinel type crystal structure as the material for the coating film. The conductive spinel type oxide is slightly poor in conductivity but excellent in sintering performance compared to the above-mentioned perovskite oxide.

When the spinet type material is used as the material for the coating film, a paste, which is a precursor of the coating film, is formed on the surface of the SUS material, and with this state, the paste is sintered. Thus, a coating body in which the surface of the interconnector (i.e., the surface of the SUS material) at the air electrode is covered by the conductive coating film that is a sintered body made of a spinel type material.

The atmospheric temperature of the interconnector at the air electrode can greatly vary between the room temperature (when the SOFC is stopped) and high temperature that is the working temperature of the SOFC (e.g., 700 to 800° C.) by the activation and stop of the SOFC. Specifically, the coating body described above is placed in an environment of the severe temperature change. When the coating body is placed under the environment of the severe temperature change, a phenomenon in which the coating film is peeled generally occurs. From the above, it is required that, in the coating body, the Cr diffusion amount is small, and further, that the coating film is difficult to be peeled even under the environment of the severe temperature change.

The present inventor has found a coating body in which a surface (a part or all of the surface) of a conductive member (made of a metal containing Fe and Cr) is covered by a coating film having a spinel type material, wherein the coating film is difficult to be peeled even when the coating body is placed in the environment of a severe temperature change.

Specifically, a coating body according to the present invention includes a conductive member made of a metal containing Fe and Cr (e.g., ferritic stainless steel), and a coating film that is configured to include a transition metal oxide having a spinel type crystal structure represented by a chemical formula of $AB_2O_4$ (A: at least one type of metal element selected from Mn and Cu, B: at least one type of metal element selected from Co and Mn), and that covers a surface (a part or all of the surface) of the conductive member.

Here, the conductive member is an interconnector that electrically connects an external conductive member and an air electrode in a cell of a solid oxide fuel cell that includes a solid electrolyte, a fuel electrode, which is arranged integral with the solid electrolyte and allows a fuel gas to react through the contact with the fuel gas, and the air electrode, which is arranged integral with the solid electrolyte and allows a gas containing oxygen to react through the contact with the gas containing oxygen.

The coating body according to the present invention has features as described below. Specifically, a first layer having a thickness of 1 to 7 μm, and including (only) elements of A, B, Fe, Cr, and O is interposed at the boundary between the coating film and the conductive member, wherein the range of a Cr concentration in the first layer is 0.1 to 0.5 times the average value of the Cr concentration in the conductive member. The "Cr concentration" means a mass concentration or a volume concentration of Cr (chrome).

More specifically, a chromia layer having a thickness of 1 to 5 μm and containing (only) $Cr_2O_3$ is interposed at the boundary at the side closer to the conductive member than the first layer, wherein the maximum value of the Cr concentration in the chromia layer falls within the range 1.5 to 4 times the average value of the Cr concentration in the conductive member. The numerical value (1 to 5 μm) of the thickness of the chromia layer is the value under the condition immediately after the coating body is manufactured (immediately after the assembly of the solid oxide fuel cell is completed), or under the condition in which a total time when the coating body is exposed to a high-temperature atmosphere corresponding to the working temperature of the solid oxide fuel cell (a total working time of the solid oxide fuel cell) is within 100 hours. The thickness of the chromia layer increases as the total time when the coating body is exposed to the high-temperature atmosphere (the total working time of the solid oxide fuel cell) increases.

Further, a second layer having a thickness of 3 to 10 μm and containing (only) elements of A, B, Fe, and O is interposed at the boundary at the side closer to the coating film than the first layer, wherein the maximum value of the Cr concentration in the second layer is smaller than the minimum value of the Cr concentration in the first layer (including zero).

The coating film in the coating body according to the present invention is characterized by having a co-continuous structure and containing (one or more) particles, each of which is a spherical particle having plural crystal surfaces exposed to the front surface and having a side with a length of 1 μm or more among plural sides constituting the outline of the crystal surface. Here, the "co-continuous structure" is not a point-contact structure in which ceramic particles are collected and the contact points of the adjacent particles are connected with the sintering, but the structure in which many base portions from which two or more (thick) arm portions extend are three-dimensionally (stereoscopically) arranged, and the arm portions extending from the different base portions are three-dimensionally (stereoscopically) connected to each other so as to allow many base portions to be three-dimensionally (stereoscopically) connected to one another through the arm portions (in a network form). In the co-continuous structure, gaps (pores) that are three-dimensionally (stereoscopically) continuous (in a network form) are formed at the region except for the base portions and the arm portions. The co-continuous structure can be restated as a three-dimensional network structure. When plural particles described above are contained in the coating film, it is preferable that each particle has a side with a length of 1 μM or more among the plural sides constituting the outline of the crystal face.

In the co-continuous structure, the thickness of the arm portion that links many base portions to one another is preferably 0.3 to 2.5 μM. The diameter of the particle is preferably 5 to 80 μm. The transition metal oxide preferably contains at least one of $MnCo_2O_4$ and $CuMn_2O_4$.

The coating film made of the spinel type material can be formed by sintering a paste, containing the powders of the respective A and B elements, with this paste being formed on the surface of the conductive member. When the coating film made of the spinel type material is formed by oxidizing the powders of the respective metal elements serving as the starting material upon the sintering, the coating film (sintered body) can sufficiently be densified, even if the sintering temperature is set to be relatively low (e.g., 700 to 900° C.).

It has been found that, in the coating body having the above-mentioned feature according to the present invention, the coating film is difficult to be peeled under an environment of a severe temperature change.

The coating film in the coating body according to the present invention may include a noble metal in addition to the transition metal oxide. Examples of the noble metal include Pt, and Ag. The electric resistance of the coating film can be reduced by containing the noble metal into the bonding agent.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DETAILED DESCRIPTION OF THE INVENTION

Structure

Figure 1:
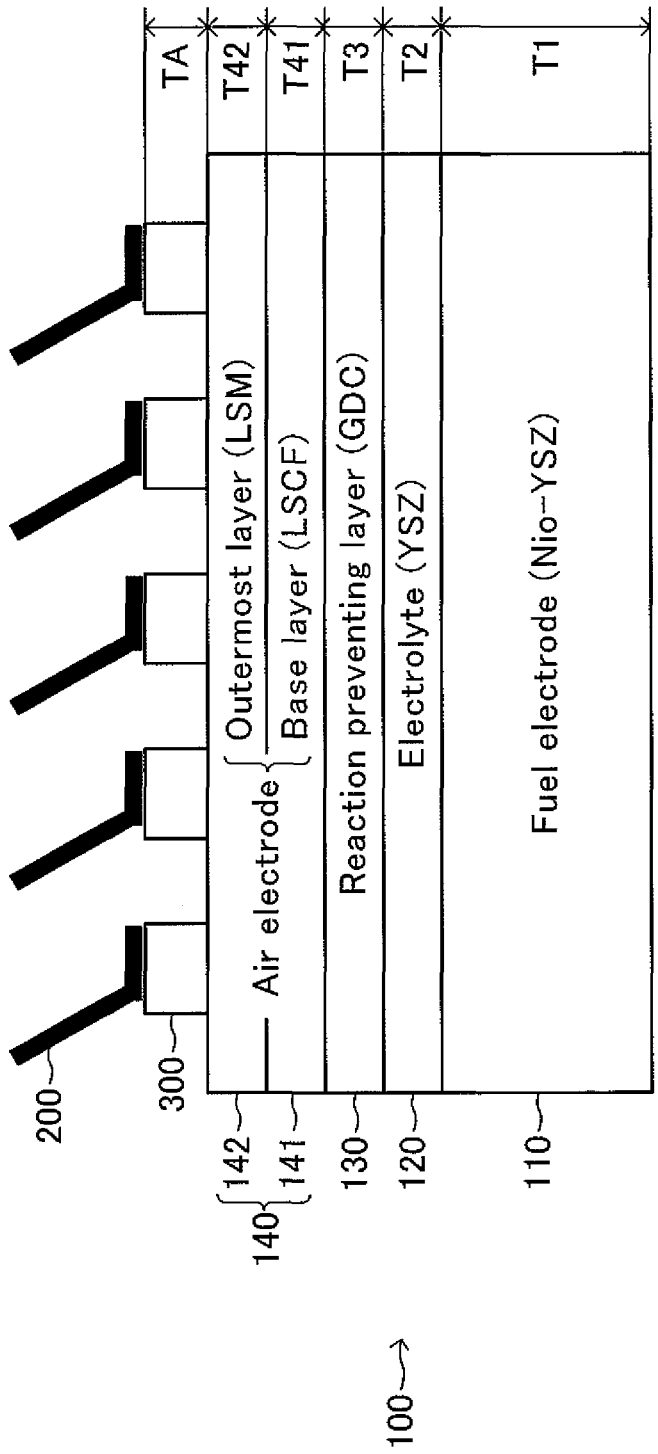
FIG. 1 is a schematic diagram illustrating an SOFC cell including a "coating body in which an interconnector at the side of an air electrode of an SOFC cell is covered by a coating film" according to an embodiment of the present invention.

FIG. 1 illustrates one example of a bonding member having a "coating body in which an interconnector at the side of an air electrode of an SOFC cell is covered by a coating film" and the air electrode of the cell, which are bonded to each other by a bonding agent, according to the embodiment of the present invention. In the bonding member illustrated in FIG. 1, an SOFC cell 100 is a stacked body including a fuel electrode 110, an electrolyte 120 stacked on the fuel electrode 110, a reaction preventing layer 130 stacked on the electrolyte 120, and an air electrode 140 stacked on the reaction preventing layer 130. The shape of the cell 100 viewed from the top is, for example, a square having a side of 1 to 10 cm, a rectangle having a long side of 5 to 30 cm and a short side of 3 to 15 cm, or a circle having a diameter of 10 cm.

The fuel electrode 110 (anode electrode) is, for example, a porous sintered body having a thin plate-like shape composed of nickel oxide NiO and yttria stabilized zirconia YSZ. The thickness T1 of the fuel electrode 110 is 0.3 to 3 mm. The thickness of the fuel electrode 110 is the greatest among the respective components of the cell 100, so that the fuel electrode 110 serves as a support substrate of the cell 100.

The electrolyte 120 is a dense sintered body having a thin plate-like shape composed of YSZ. The thickness T2 of the electrolyte 120 is 3 to 30 µm.

The reaction preventing layer 130 is a dense sintered body having a thin plate-like shape composed of celia. Specific examples of celia include GDC (gadolinium-doped celia), SDC (samarium-doped celia), etc. The thickness T3 of the reaction preventing layer 130 is 3 to 20 µm. The reaction preventing layer 130 is interposed between the electrolyte 120 and the air electrode layer 140 in order to prevent the occurrence of the phenomenon in which an electric resistance between the electrolyte 120 and the air electrode 140 increases through the reaction between the zirconium in the electrolyte 120 and the strontium in the air electrode 140 during the fabrication of the cell or in the cell 100, which is currently operated, of the SOFC.

The air electrode 140 (cathode electrode) includes two layers, which are a base layer 141 and an outermost layer 142. The base layer 141 is a porous sintered body having a thin plate-like shape and made of lanthanum strontium cobalt ferrite LSCF ($La_{0.6}Sr_{0.4}Co_{0.2}Fe_{0.8}O_3$). The outermost layer 142 is a porous sintered body having a thin plate-like shape and having a perovskite structure containing manganese. The outermost layer 142 is made of, for example, lanthanum strontium manganite LSM ($La_{0.8}Sr_{0.2}MnO_3$), lanthanum manganite LM ($LaMnO_3$), etc. At the air electrode 140, the thickness T41 of the base layer 141 is 5 to 50 µm, and the thickness T42 of the outermost layer 142 is 5 to 50 µm.

The reason why the air electrode 140 has two-layer structure is based upon the fact that the reaction speed of the LSCF of the chemical reaction represented by the formula (1) is higher than that of the LSM because the activity of the LSCF is higher than that of the LSM, and upon the fact that the bonding strength of the LSM to the bonding agent containing the spinel type material is greater than that of the LSCF. Specifically, the air electrode layer 140 includes two layers in order to increase the reaction speed for the chemical reaction represented by the formula (1) in the air electrode 140 and to increase the bonding strength between the air electrode and the bonding agent.

In the present embodiment, the base layer 141 includes only one layer that is the LSCF layer. However, the base layer 141 may include plural layers. For example, the base layer 141 may include two layers, which are the LSCF layer (air electrode) stacked on the reaction preventing layer 130 and a lanthanum strontium cobalt LSC ($La_{0.8}Sr_{0.2}CoO_3$) layer (current-collecting layer) stacked on the LSCF layer (i.e., interposed between the LSCF layer and the outermost layer (LSM layer) 142). Further, an LSCF layer (thermal stress buffer layer) may be interposed between the LSC layer and the outermost layer (LSM layer) 142 (i.e., the base layer 141 may include three layers). Instead of the LSCF, LSC, lanthanum strontium ferrite LSF ($La_{0.8}Sr_{0.2}FeO_3$), lanthanum nickel ferrite LNF ($LaNi_{0.6}Fe_{0.4}O_3$), etc. may be used as the material of the air electrode.

Figure 2:
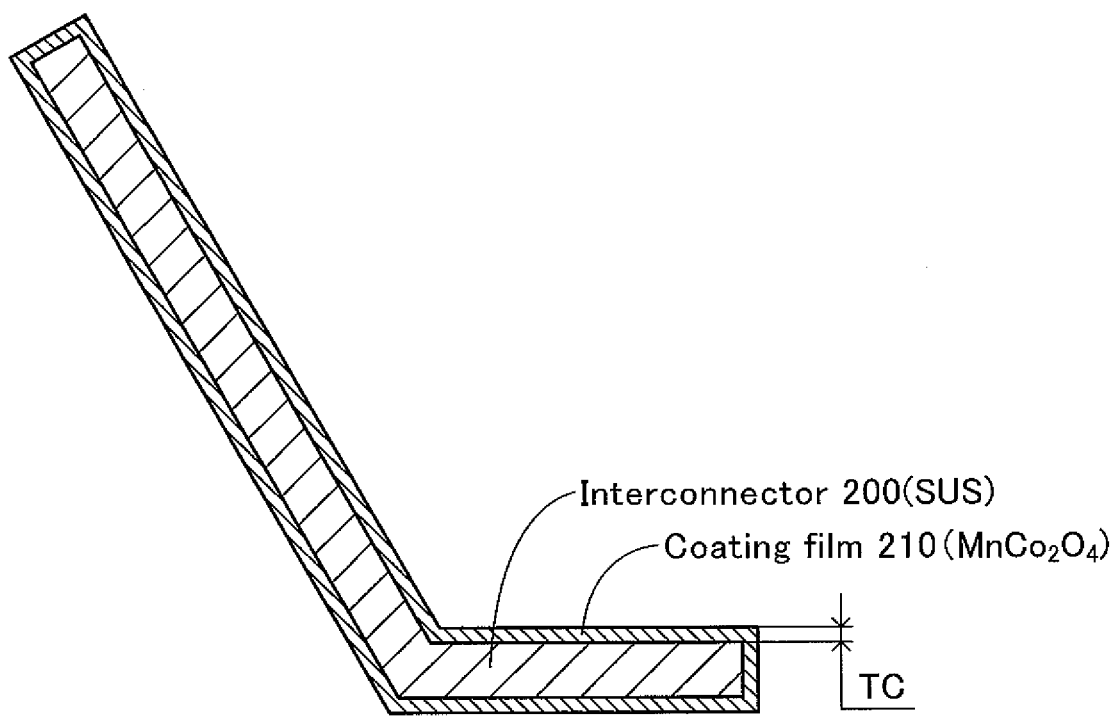
FIG. 2 is an enlarged sectional view of the coating body illustrated in FIG. 1.

The interconnector 200 (corresponding to the "conductive member" described above) is a conductive member made of a ferritic SUS material (ferritic stainless steel containing Fe and Cr). The whole surface of the interconnector 200 is covered by a coating film 210 as illustrated in FIG. 2 in order to suppress the "Cr poisoning of the air electrode". Thus, the coating body in which the interconnector 200 is covered by the coating film 210 is formed. It is to be noted that only a part of the surface of the interconnector 200 (in particular, a part of the surface facing the outermost layer 142 (directing to the outermost layer 142) of the air electrode 140) may be covered by the coating film 210.

The coating film 210 is a sintered body made of a transition metal oxide having a spinel type crystal structure. The transition metal oxide is represented by a chemical formula of $AB_2O_4$ (A: at least one type of metal element selected from Mn and Cu, B: at least one type of metal element selected from Co and Mn). For example, the coating film 210 is made of $MnCo_2O_4$, $CuMn_2O_4$, etc. The thickness TC of the coating film 210 is 5 to 150 µm. A noble metal such as Pt or Ag may be contained in the coating film 210. The electric resistance of the coating film can be reduced by containing the noble metal into the coating film 210.

The respective bonding portions (e.g., a part of the coating film 210) of the plural interconnectors 200, each having the same shape (each being covered by the coating film 210), and the bonding portion of the outermost layer 142 (i.e., LSM layer, or the like) of the air electrode 140 in the cell are bonded by a bonding agent 300 so as to be electrically connected to each other.

The bonding agent 300 is a sintered body made of a metal material, or a conductive ceramic material. Silver materials are considered as the metal material, and La—Sr—Co—Fe perovskite complex material is considered as the conductive ceramic material. The thickness TA of the bonding agent 300 is 20 to 500 μm.

Fabrication Process

Next, one example of a method of fabricating the bonding member illustrated in FIG. 1 will be described below. Firstly, one example of fabricating the cell 100 will be described.

The fuel electrode layer 110 is formed as described below. Specifically, 60 parts by weight of NiO powder, and 40 parts by weight of YSZ powder are mixed, and polyvinyl alcohol (PVA) is added to the mixture as a binder, whereby slurry is prepared. This slurry is dried and granulated with a spray dryer to obtain powders for the fuel electrode. The powders are molded with a die press molding, and then, the resultant is sintered in an electric furnace at 1400° C. for 3 hours in air, whereby the fuel electrode 110 is fabricated.

The electrolyte 120 is formed on the fuel electrode 110 as described below. Specifically, water and binder are added into YSZ powder, and the resultant mixture is mixed with a ball mill for 24 hours to prepare slurry. This slurry is applied on the fuel electrode 110, dried, and then, co-sintered in an electric furnace at 1400° C. for 2 hours in air, whereby the electrolyte 120 is formed on the fuel electrode 110. When a film, which is to become the electrolyte 120 afterward, is formed on the fuel electrode 110, a tape staking method, printing method, etc. may be used.

The reaction preventing layer 130 is formed on the electrolyte 120 as described below. Specifically, water and binder are added into GDC powder, and the resultant mixture is mixed with a ball mill for 24 hours to prepare slurry. The slurry is applied on the electrolyte 120, dried, and then, sintered in an electric furnace at 1350° C. for 1 hour in air, whereby the reaction preventing layer 130 is formed on the electrolyte 120. When a film, which is to become the reaction preventing layer 130 afterward, is formed on the electrolyte 120, a tape staking method, printing method, etc. may be used. The reaction preventing layer 130 may be formed with co-sintering.

The base layer 141 of the air electrode 140 is formed on the reaction preventing layer 130 as described below. Specifically, water and binder are added into LSCF powder, and the resultant mixture is mixed with a ball mill for 24 hours to prepare slurry. The slurry is applied on the reaction preventing layer 130, dried, and then, sintered in an electric furnace at 1000° C. for 1 hour in air, whereby the air electrode 140 is formed on the reaction preventing layer 130.

The outermost layer 142 is formed on the base layer 141 as described below. Specifically, water and binder are added into LSM powder, and the resultant mixture is mixed with a ball mill for 24 hours to prepare slurry. The slurry is applied on the base layer 141, dried, and then, co-sintered in an electric furnace at 1000° C. for 1 hour in air, whereby the outermost layer 142 is formed on the base layer 141. One example of the method of fabricating the cell 100 has been described above.

The interconnector 200 is formed by processing a ferritic SUS material containing Fe and Cr into a predetermined shape by a machining process. Plural interconnectors 200, each having the same shape, are prepared.

The formation of the coating film 210 on the whole surface of each of the interconnectors 200 is attained as described below. The case in which the spinel type material is $MnCo_2O_4$ will be described as one example. Firstly, metal powder of manganese Mn and metal powder of cobalt Co are weighted and mixed with a molar ratio of 1:2. The diameter of the metal powder is 0.5 to 5 μm, and the average diameter is 2 μm. A noble metal powder such as Pt or Ag may be added thereto. Ethyl cellulose serving as binder and terpineol serving as a solvent are added to the mixture, according to need, and the resultant mixture is mixed in a mortar to form a paste used for coating. The coating paste is applied onto the whole surface of each of the interconnectors 200 with a dipping method or the like. Thereafter, this coating paste is dried at 100° C. for 1 hour, and then, sintered in air for 1 hour at a relatively low temperature of 850° C. With this process, the coating film 210, which is a sintered body, is formed on the whole surface of each of the interconnectors 20.

Specifically, powders of the respective metal elements constituting the spinel type material are used as a starting material, and the powders are oxidized upon the sintering, whereby the coating film 210 having the spinel type material is formed. The reason why the paste is sufficiently densified even if the sintering temperature of the paste is relatively low is considered to be based upon the fact that the spinel type crystal (crystal of complex oxide) is combined and grown due to the local temperature rise on the surface of the powder by the heat generated from the oxidation reaction (=heat-generating reaction) of the powders of the respective metal elements.

The bonding between the outermost layer 142 (covered by the coating film 210) and the interconnector 200 by the bonding agent 300 is attained as described below. The case in which the material of the bonding agent is a silver material will be described as one example. Firstly, water and binder are added to Ag powder, and the resultant mixture is mixed in a ball mill to form a bonding paste. The bonding paste is applied on the bonding portion between the surface of the outermost layer 142 (i.e., LSM layer) of the air electrode 140 in the cell 100 and the interconnector 200 (covered by the coating film 210) so as to bond the outermost layer 142 and the interconnector 200 (covered by the coating film 210). Thereafter, this paste is dried at 100° C. for 1 hour, and then, sintered in air for 1 hour at a relatively low temperature of 850° C., whereby the bonding agent 300 that is a sintered body is formed.

The outermost layer 142 and the interconnector 200 are bonded and electrically connected with this bonding agent 300. One example of the method of fabricating the bonding member having "the coating body in which the interconnector at the side of the air electrode in the SOFC cell" and the air electrode of the cell illustrated in FIG. 1 according to the present embodiment has been described above.

Feature of Coating Film

Figure 3:
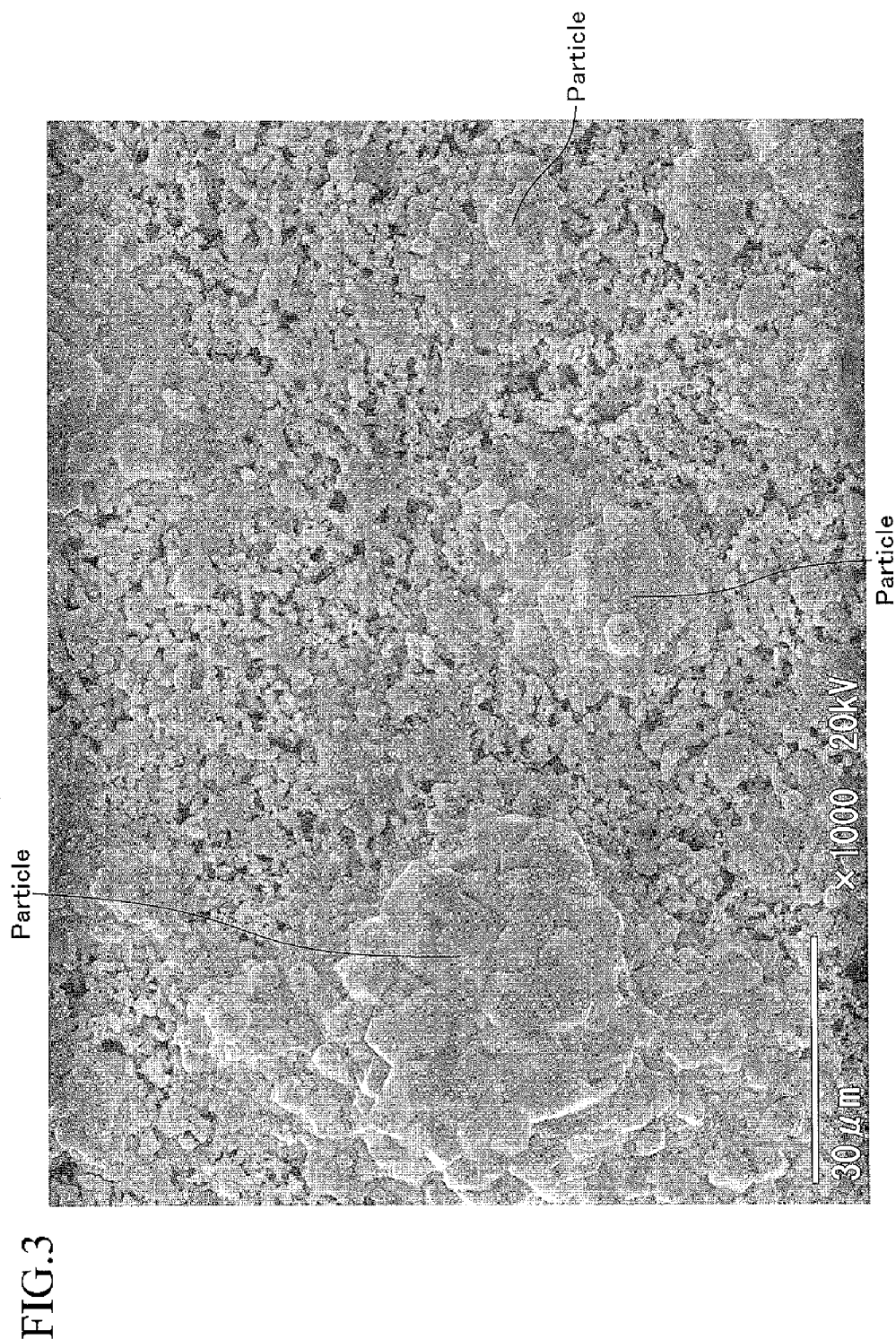
FIG. 3 is a diagram illustrating a coating film included in the coating body according to the embodiment of the present invention as observed at a magnification of 1000 with a scanning electron microscope.

Next, the feature of the coating film 210 according to the present embodiment, i.e., the feature of the coating film that is produced in such a manner that the powders of the respective metal elements (starting material) constituting the spinel type material ($MnCo_2O_4$) is oxidized during the sintering, will be described with reference to FIGS. 3 to 7. FIG. 3 is a view (SEM image) illustrating the surface of the coating film 210 that is observed at a magnification of 1000, FIGS. 4 and 6 are views (SEM images) illustrating the surface of the coating film 210 that is observed at a magnification of 5000, and FIGS. 5 and 7 are views (SEM images) illustrating the surface of the coating film 210 that is observed at a magnification of 10000, with the use of a scanning electron microscope (SEM).

Figure 4:
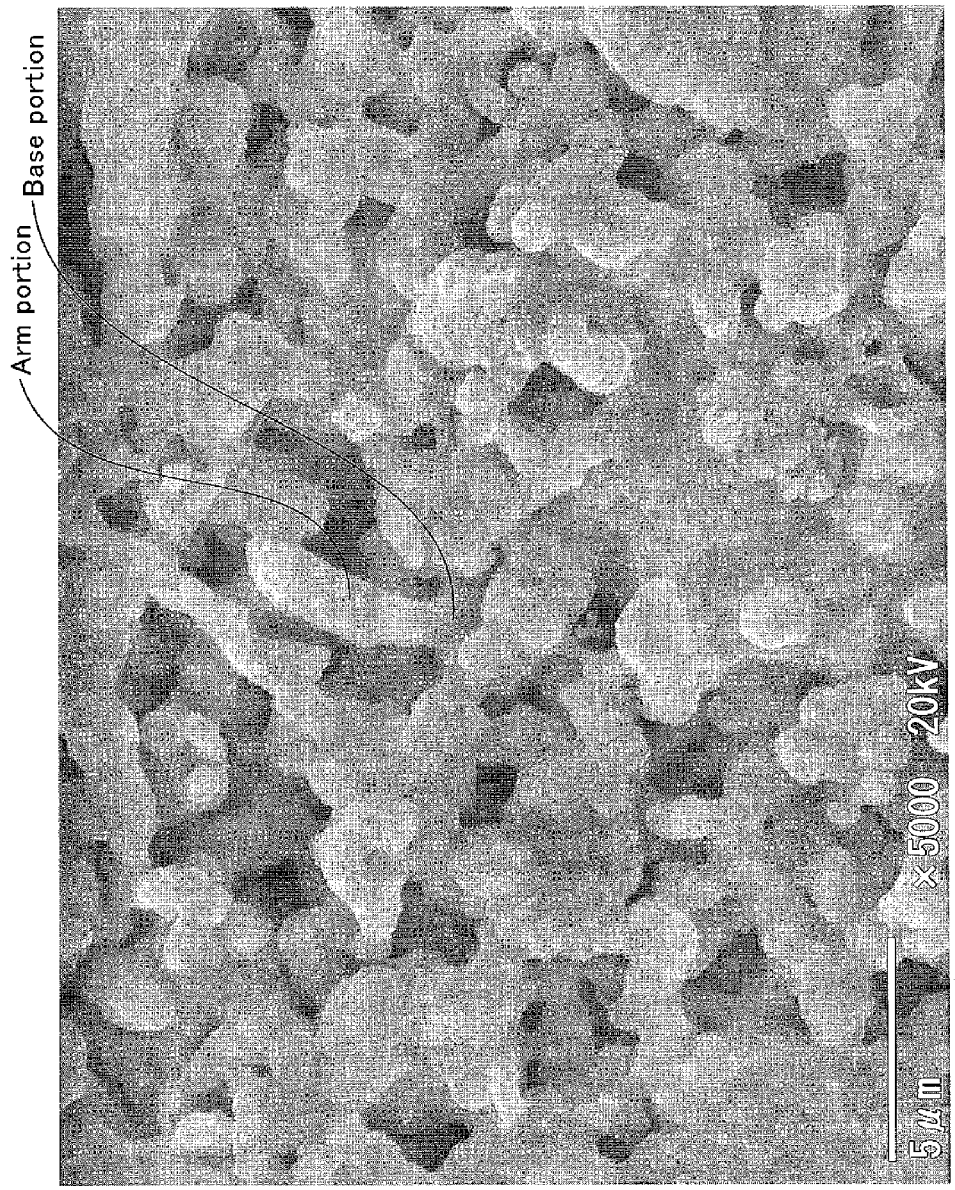
FIG. 4 is a diagram illustrating a coating film included in the coating body according to the embodiment of the present invention as observed at a magnification of 5000 with a scanning electron microscope.
Figure 5:
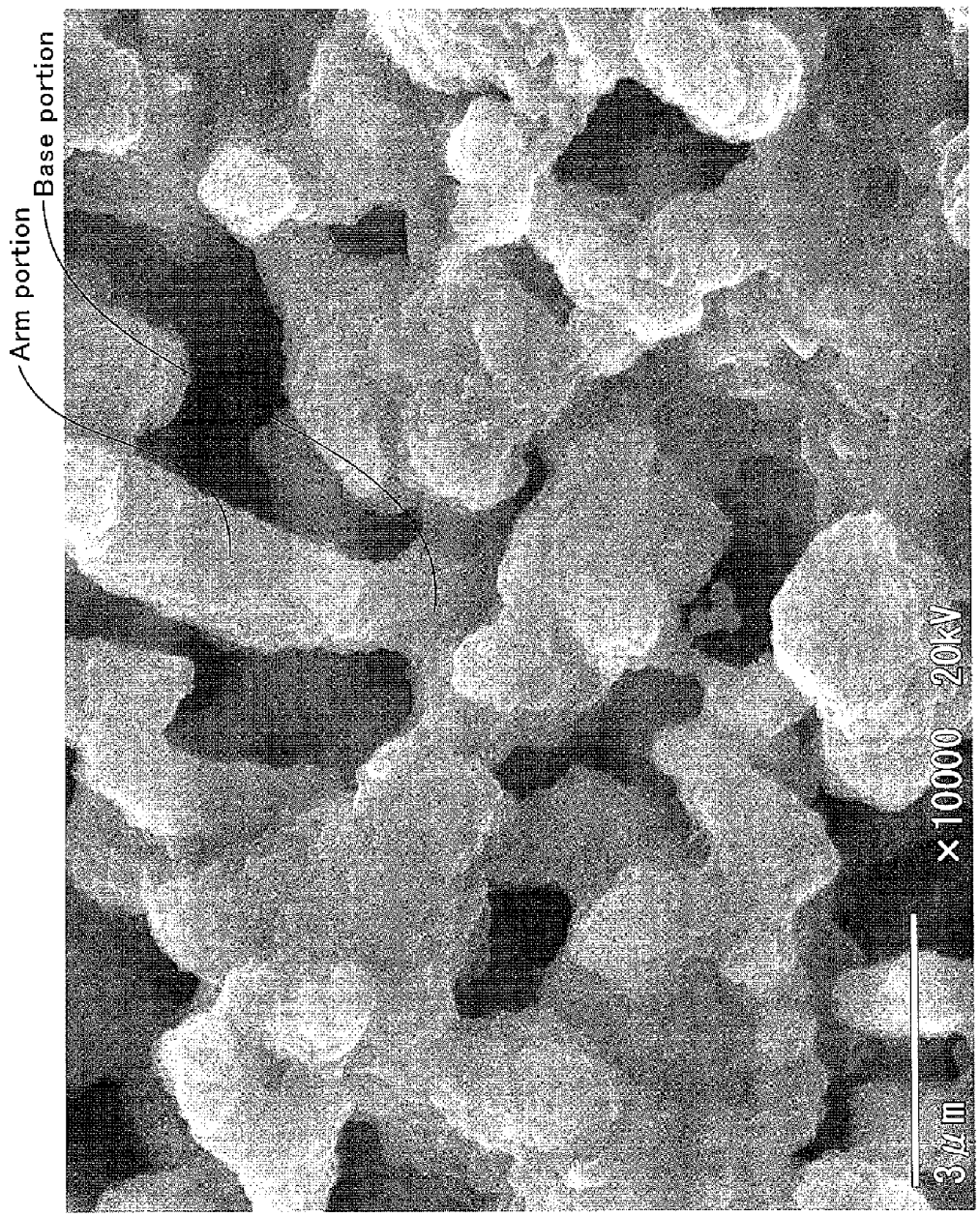
FIG. 5 is a diagram illustrating a coating film included in the coating body according to the embodiment of the present invention as observed at a magnification of 10000 with a scanning electron microscope.

As apparent from FIGS. 4 and 5, the coating film 210 can be said to have a "co-continuous structure". In the "co-continuous structure", a thickness of an "arm portion" that three-dimensionally (stereoscopically) links many "base portions" (the portions from which two or more arm portions extend) is 0.3 to 2.5 µm. The "thickness of the arm portion" is calculated as described below in the present embodiment. Specifically, 10 portions having the co-continuous structure are firstly extracted randomly from the SEM image. Three data pieces each for the respective portions involved with the thickness of the arm portion measured from the extracted portions are collected. The "thickness of the arm portion" is calculated based upon the obtained 30 data pieces in total. It is considered that the formation of the "co-continuous structure" is related to the above-mentioned "growth action of the spinel type crystal due to the heat generated by the oxidation reaction during when the paste is sintered".

Figure 6:
FIG. 6 is a diagram illustrating a coating film included in the coating body according to the embodiment of the present invention as observed at a magnification of 5000 with a scanning electron microscope.
Figure 7:
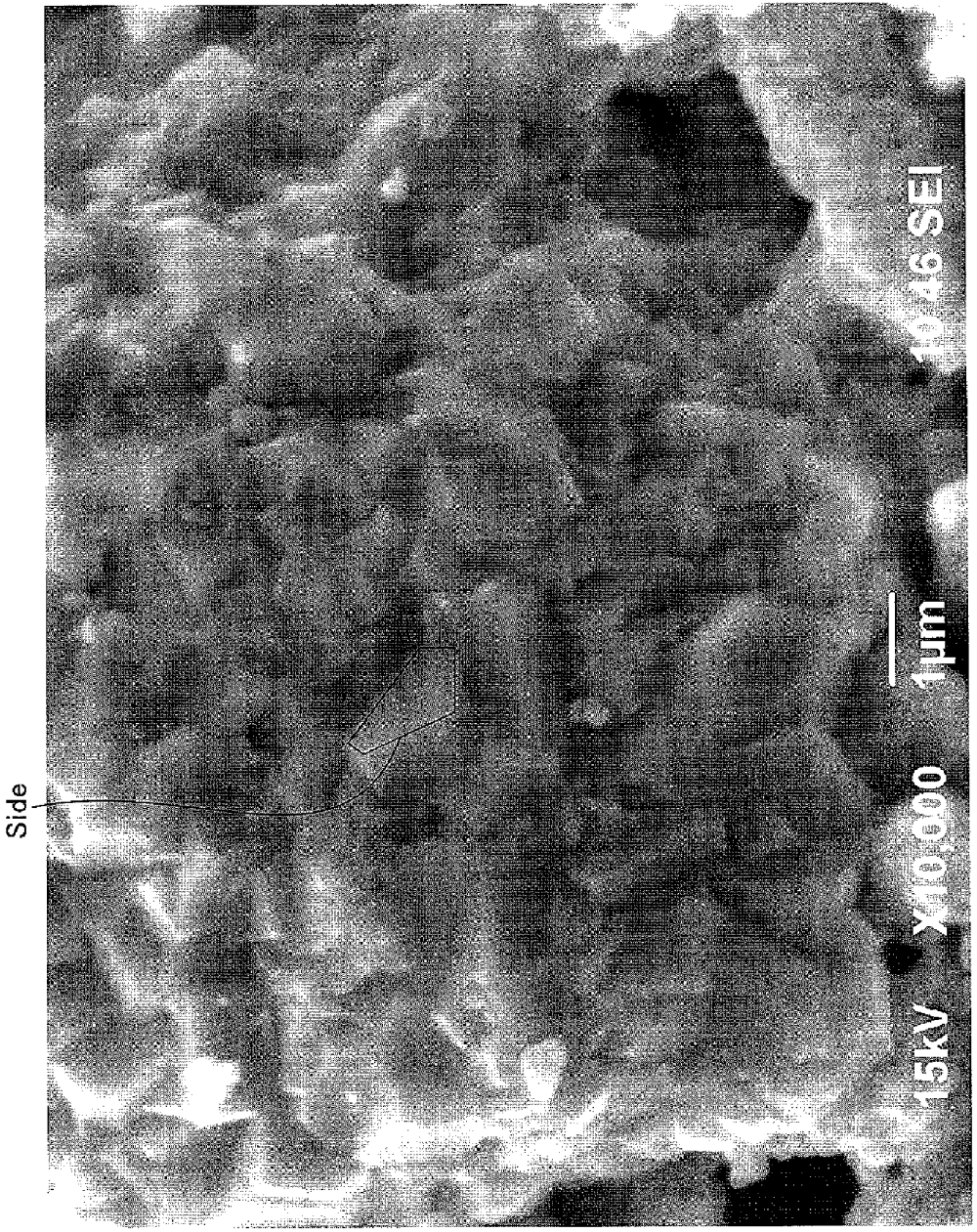
FIG. 7 is a diagram illustrating a coating film included in the coating body according to the embodiment of the present invention as observed at a magnification of 10000 with a scanning electron microscope.

As can be understood from FIGS. 3, 6, and 7, the coating film 210 includes spherical plural particles, each of which has plural crystal faces exposed to the surface. These particles are dispersed in the "co-continuous structure". The diameter of each of the plural particles is 5 to 80 µm. Here, as "the diameter of the particle", the longest one of the linear distances (the length corresponding to the diameter) passing through the center of the spherical particle in the particle is adopted. Further, the plural particles include at least one or more particles having a side of 1 µm or more of plural sides constituting the outline of the crystal surface (see FIG. 7). The formation of the "particle" described above is also considered to be related to the above-mentioned "growth action of the spinel type crystal due to the heat generated by the oxidation reaction during when the paste is sintered".

As described above, in the above-mentioned embodiment, the coating film having the above-mentioned feature is synthesized by using a metal as a starting material, and by utilizing a reaction heat during the heat treatment. Instead of this, an organic metal may be used as the starting material. For example, di-i-propoxymanganese(II) (chemical formula: $Mn(O-i-C_3H_7)_2$) as an organic metal containing manganese, di-i-propoxycobalt(II) (chemical formula: $Co(O-i-C_3H_7)_2$) as an organic metal containing cobalt, and bis(dibivalloyl metanate) copper (chemical formula: $Cu(C_{11}H_{18}O_2)_2$) as an organic metal containing copper, can be used.

Feature of Boundary Between Coating Film and Interconnector

The feature of the boundary between the coating film 210 and the interconnector 200 in the coating body (see FIG. 2) according to the present embodiment will next be described. In the description below, $MnCo_2O_4$ is used as the spinel type material constituting the coating film 210, and ferritic stainless steel (SUS) of ZMG232L (commercial name) for an SOFC made by Hitachi Metals Ltd. is used as the material of the interconnector 200.

Figure 8:
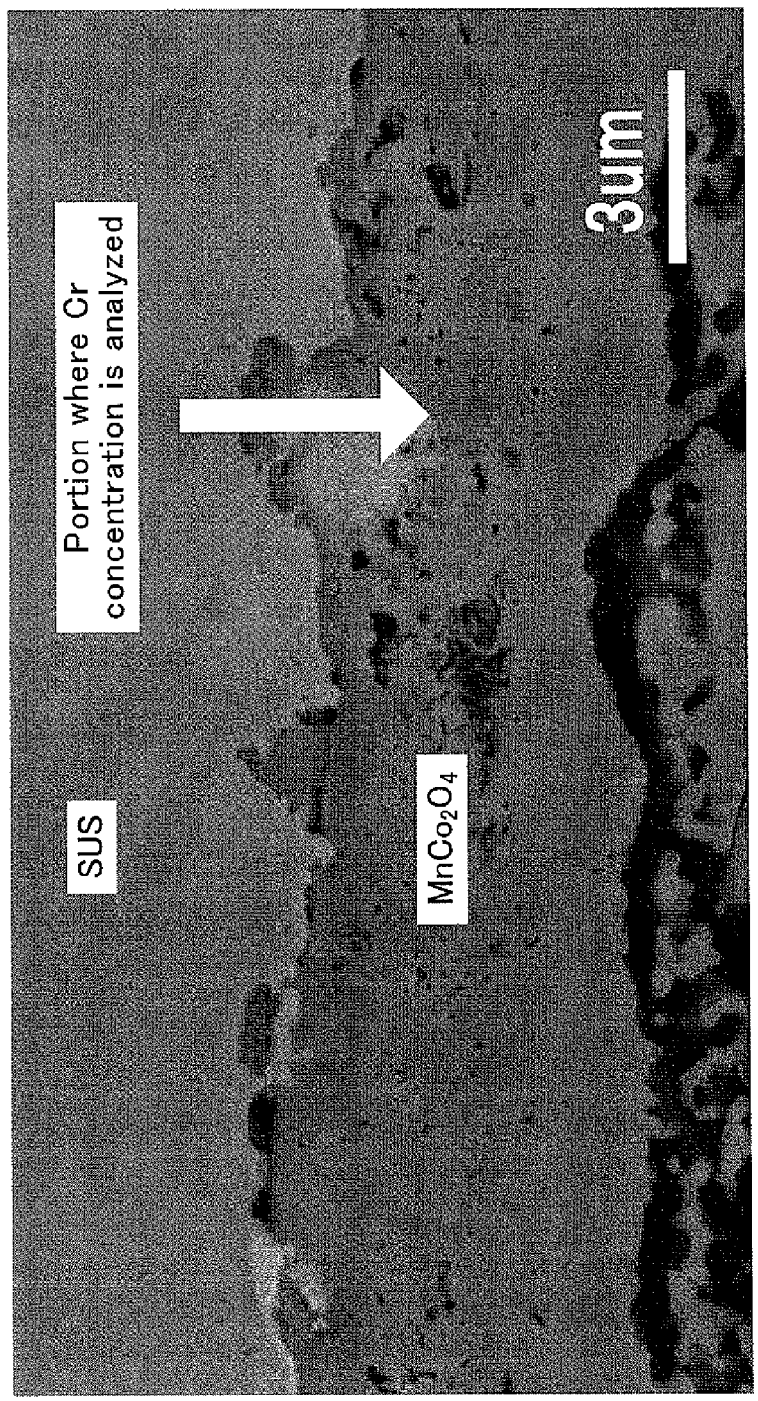
FIG. 8 is a diagram illustrating one example of an image of the cross-section of the vicinity of the boundary between the interconnector and the coating film in the coating member according to the present embodiment as observed at a magnification of 2000 with an electron emission type analytical electron microscope.
Figure 9:
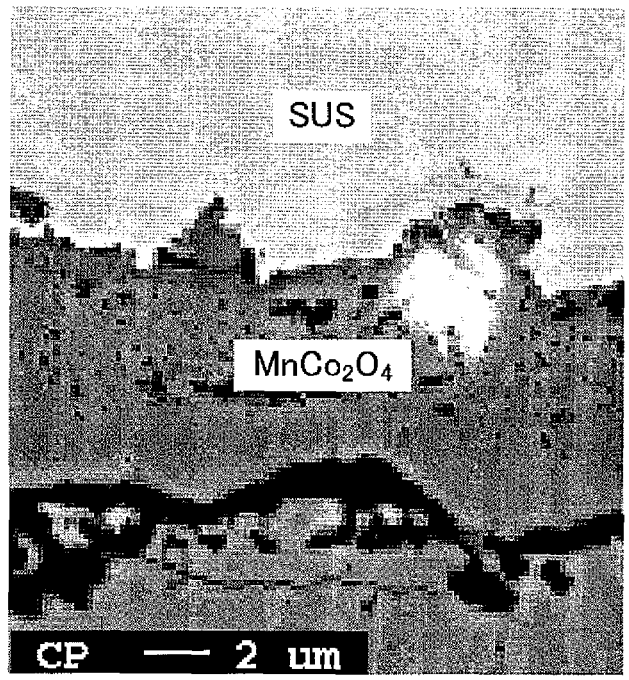
FIG. 9 is a partial image including the boundary in the image illustrated in FIG. 8.
Figure 10:
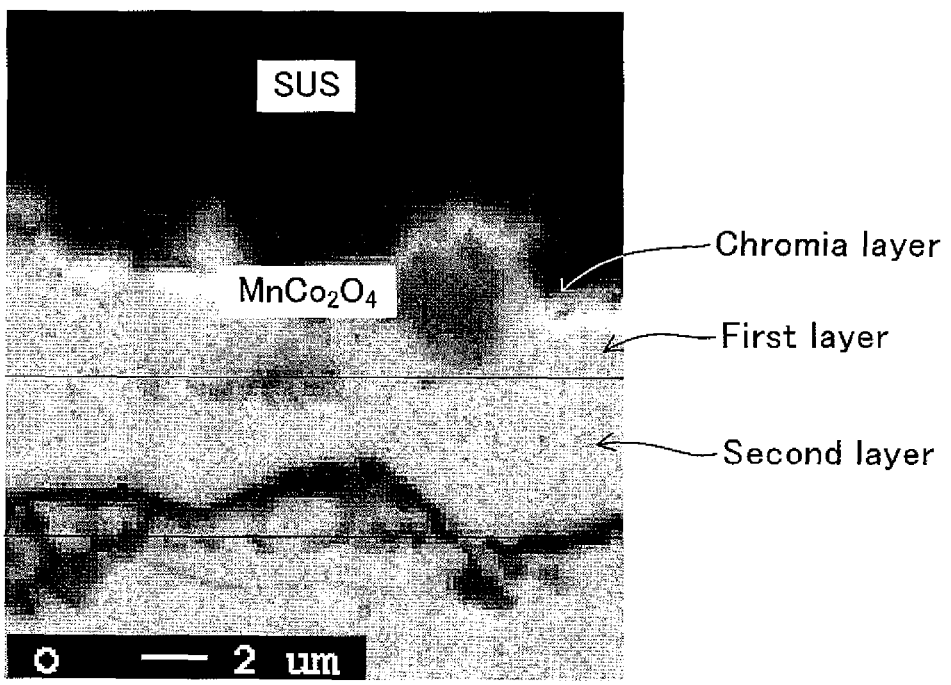
FIG. 10 is an image in which a mapping of oxygen is carried out for the portion corresponding to the image illustrated in FIG. 9.
Figure 11:
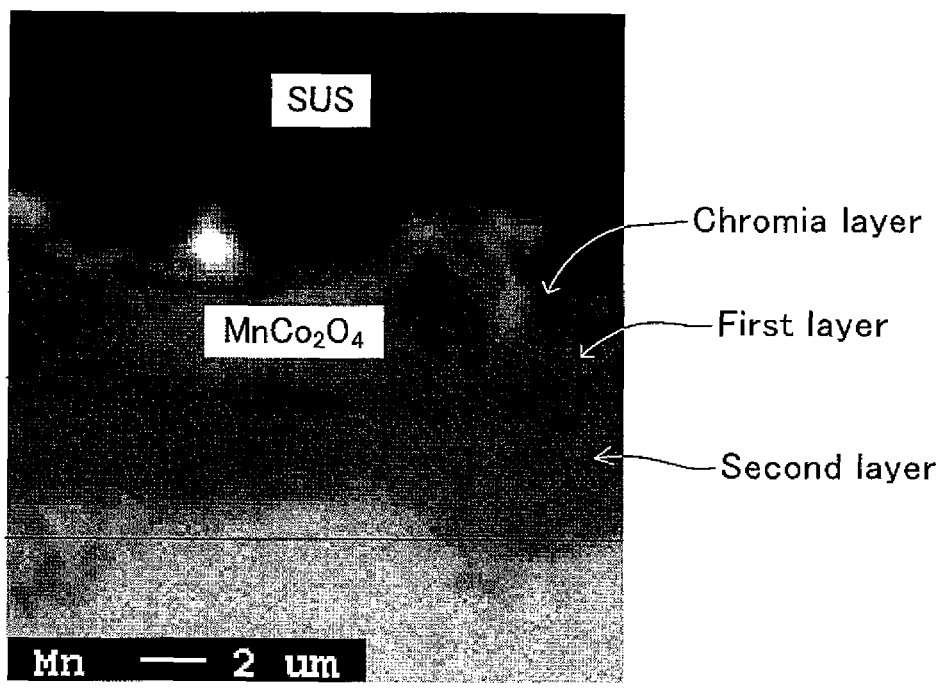
FIG. 11 is an image in which a mapping of manganese is carried out for the portion corresponding to the image illustrated in FIG. 9.
Figure 12:
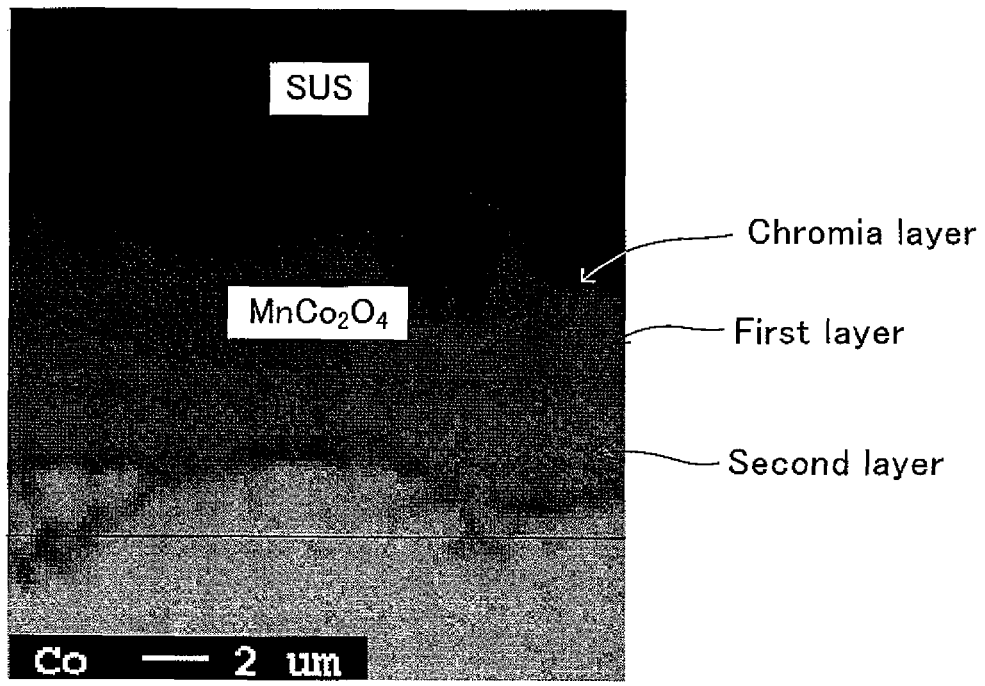
FIG. 12 is an image in which a mapping of cobalt is carried out for the portion corresponding to the image illustrated in FIG. 9.
Figure 13:
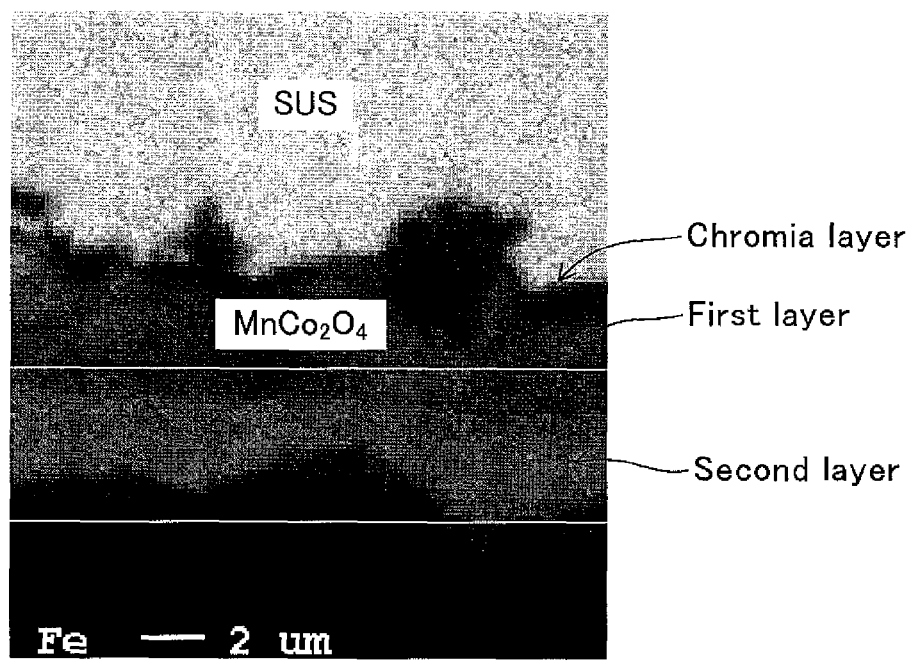
FIG. 13 is an image in which a mapping of iron is carried out for the portion corresponding to the image illustrated in FIG. 9.
Figure 14:
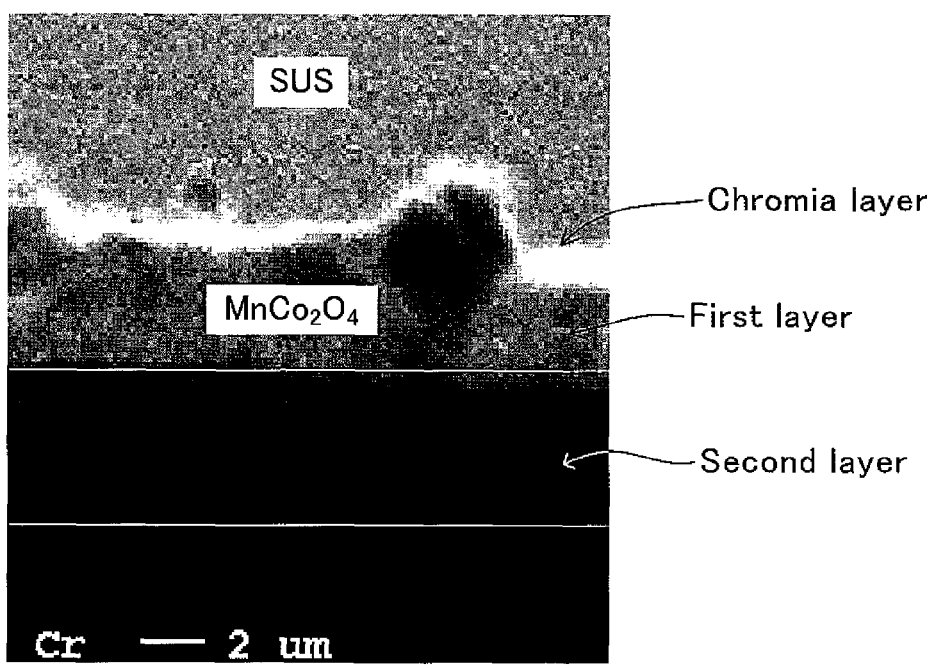
FIG. 14 is an image in which a mapping of chrome is carried out for the portion corresponding to the image illustrated in FIG. 9.

FIG. 8 is one example of an image of a cross-section of the vicinity of the boundary as observed at a magnification of 2000 with an electron emission type analytical electron microscope. The element contained in the boundary is analyzed. The result is as described below. FIG. 9 is a partial image including the boundary in the image in FIG. 8. An element analysis (element mapping) is carried out for the portion corresponding to the image in FIG. 9. FIGS. 10 to 14 respectively illustrate the results of the mapping of O (oxygen), the mapping of Mn (manganese), the mapping of Co (cobalt), the mapping of Fe (iron), and the mapping of Cr (chrome). In FIGS. 10 to 14, the black and white colors in the images represent an element concentration, wherein the portion having a light black and white color (white portion) indicates that the element concentration is great, while the portion having a dark black and white color (black portion) indicates that the element concentration is small. These images and analytical results are acquired with the use of a field-emission-type analytical microscope (JXA-8500F) made by JEOL Ltd.

As can be understood from FIGS. 10 to 14, three layers are interposed at the boundary between the coating film 210 and the interconnector 200. Of these three layers, the layer that is the closest to the interconnector 200 (the layer that is in contact with the interconnector 200) mainly contains Cr and O. Specifically, this layer can be said to be the layer containing a chromia ($Cr_2O_3$) (or the layer containing only a chromia). This layer is referred to as the "chromia layer" below. The middle layer of the three layers contains Mn, Co, Fe, Cr, and O (or contains only Mn, Co, Fe, Cr, and O). This layer is referred to as a "first layer" below. The layer that is the closest to the coating film 210 (the layer in contact with the coating film 210) contains Mn, Co, Fe, and O (or contains only Mn, Co, Fe, and O). This layer is referred to as a "second layer" below.

The first and the second layers can be said to be reaction layers formed by the reaction between the spinel type material ($MnCo_2O_4$) and the stainless steel (containing Fe and Cr). It is presumed that these first and second layers are formed when the above-mentioned "coating paste" is heat-treated at 850° C. with the coating paste being formed on the surface of the interconnector 200.

The thickness of the chromia layer is 1 to 5 µm, the thickness of the first layer is 1 to 7 µm, and the thickness of the second layer is 3 to 10 µm. The thickness of each layer is calculated by analyzing the images of the electron scanning microscope and the images indicating the results of the element analysis described above.

Figure 15:
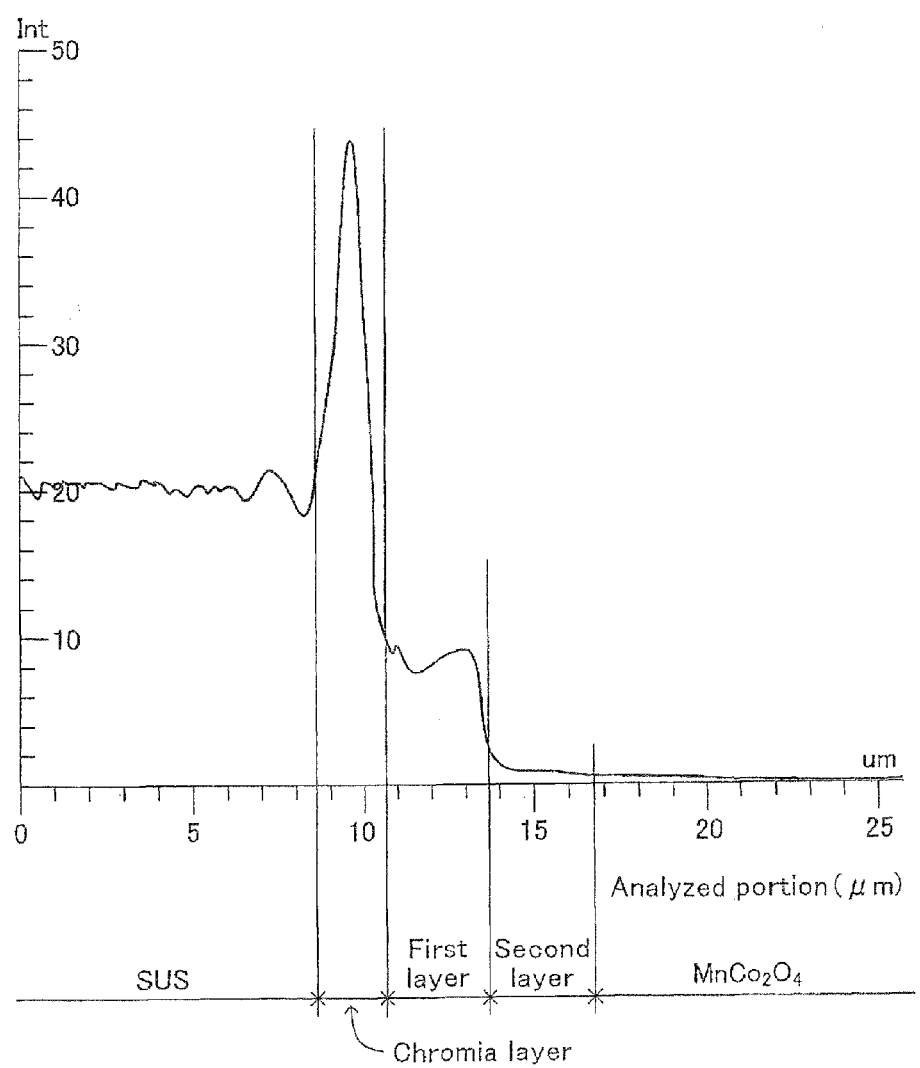
FIG. 15 is a graph illustrating a transition of Cr concentration in the thickness direction at the portion corresponding to the image illustrated in FIG. 9.

The Cr concentration in each of the chromia layer, and the first and second layers is analyzed. The Cr concentration is the volume concentration or the mass concentration of Cr (chrome) element in the layer. The result is described below. FIG. 15 is a graph illustrating one example of the result of the element analysis for Cr. In the element analysis, the portion to be analyzed is scanned along the thickness direction from the interconnector 200 (SUS) toward the coating film 210 ($MnCo_2O_4$) as indicated by a white arrow in FIG. 8. The axis of ordinate in FIG. 15 represents a diffraction intensity of Cr element. The diffraction intensity of Cr element is equivalent to the concentration of Cr element. This analytical result is also acquired with the use of a field-emission-type analytical microscope (JXA-8500F) made by JEOL Ltd.

As can be understood from FIG. 15, the maximum value of the Cr concentration in the chromia layer is greater than the Cr concentration in the interconnector 200, and the Cr concentration in the first layer moves within the range smaller than the Cr concentration in the interconnector 200. More specifically, the maximum value of the Cr concentration in the chromia layer is 1.5 to 4 times the average value of the Cr concentration in the interconnector 200. The Cr concentration in the first layer (the range from the minimum value to the maximum value) falls within the range 0.1 to 0.5 times the average value of the Cr concentration in the interconnector 200. The maximum value of the Cr concentration in the second layer is smaller than the minimum value of the Cr concentration in the first layer (including zero).

The feature of the "boundary between the coating film 210 and the interconnector 200" in case where $MnCo_2O_4$ is used as the spinel type material constituting the coating film 210 has been described above. Even when the material other than $MnCo_2O_4$ (e.g., $CuMn_2O_4$) represented by the chemical formula of $AB_2O_4$ (A: at least one type of metal element selected from Mn and Cu, B: at least one type of metal element selected from Co and Mn) is used as the spinel type material constituting the coating film 210, it is confirmed that the three layers having the feature described above are formed at the boundary between the coating film 210 and the interconnector 200. For example, when $CuMn_2O_4$ is used as the spinel type material, the first layer becomes the layer containing Cu, Mn, Fe, Cr, and O (or containing only Cu, Mn, Fe, Cr, and O), and the second layer becomes the layer containing Cu, Mn, Fe, and O (or containing only Cu, Mn, Fe, and O).

Operation and Effect

Next, an operation and effect of the coating body according to the present embodiment, i.e., the coating body in which the interconnector 200 is covered by the coating film 210 that is formed by using powders of respective metal elements constituting the spinel type material as a starting material, will be described. In order to describe the operation and effect, a coating body in which an interconnector is covered by a coating film that is formed by using a powder of spinel type material, which is synthesized beforehand, as a starting material is prepared as a comparative example. The comparative example will firstly be described below.

Comparative Example

The coating film according to the comparative example is formed as described below. Firstly, the spinel type material ($MnCo_2O_4$) synthesized according to a predetermined process is pulverized by a pot mill, whereby powders of the spinel type material (complex oxide) are obtained. The diameter of the powder is 0.2 to 2 µm, and the average diameter is 0.5 Ethyl cellulose serving as binder and terpineol serving as a solvent are added to this powder, according to need, to prepare a coating paste. This paste is applied all over the surface of the interconnector, and this paste is dried for 1 hour at 100° C. Thereafter, the paste is sintered in air for 1 hour at a high temperature of 1000° C., whereby the coating film, which is a sintered body, according to the comparative example is formed.

In the comparative example, if the sintering temperature of the paste is lowered as in the embodiment, the paste is not sufficiently densified. This is based upon the fact that, because the oxide paste, which has already been oxidized, is used in the comparative example, the growth action of the spinel type crystal by the heat caused by the oxidation reaction during when the paste is sintered cannot be expected, different from the above-mentioned embodiment.

Figure 16:
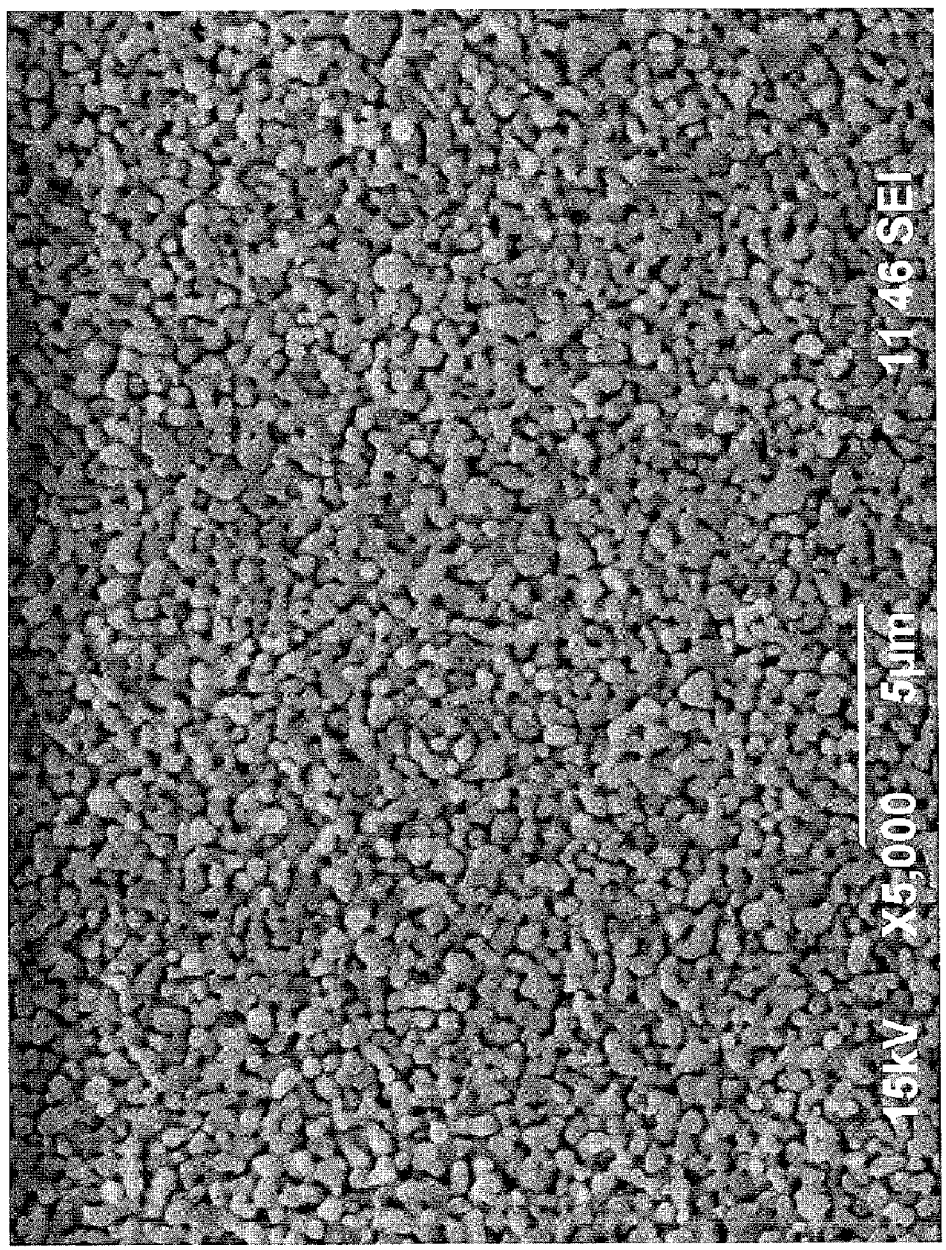
FIG. 16 is a diagram illustrating a coating film according to a comparative example as observed at a magnification of 5000 with a scanning electron microscope.
Figure 17:
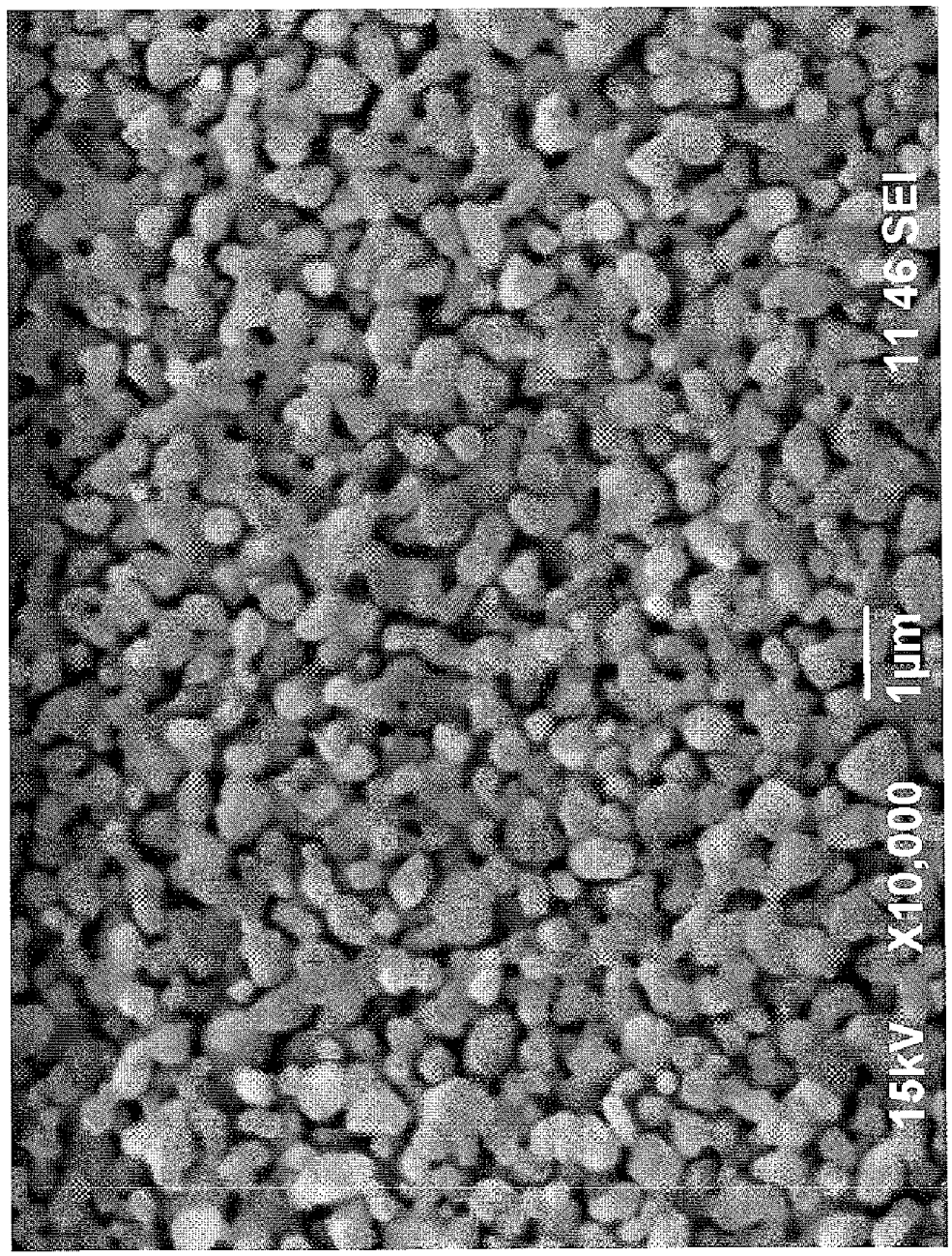
FIG. 17 is a diagram illustrating the coating film according to the comparative example as observed at a magnification of 10000 with a scanning electron microscope.

FIGS. 16 and 17 are views illustrating the surface of the coating film according to the comparative example that is observed at a magnification of 5000 and 10000 with a scanning electron microscope (SEM). As can be understood from FIGS. 16 and 17, the above-mentioned "particle" or "co-continuous structure" is not found in the coating film according to the comparative example, but instead of this, the structure in which the powders of the starting material are merely collected and sintered is found.

Figure 18:
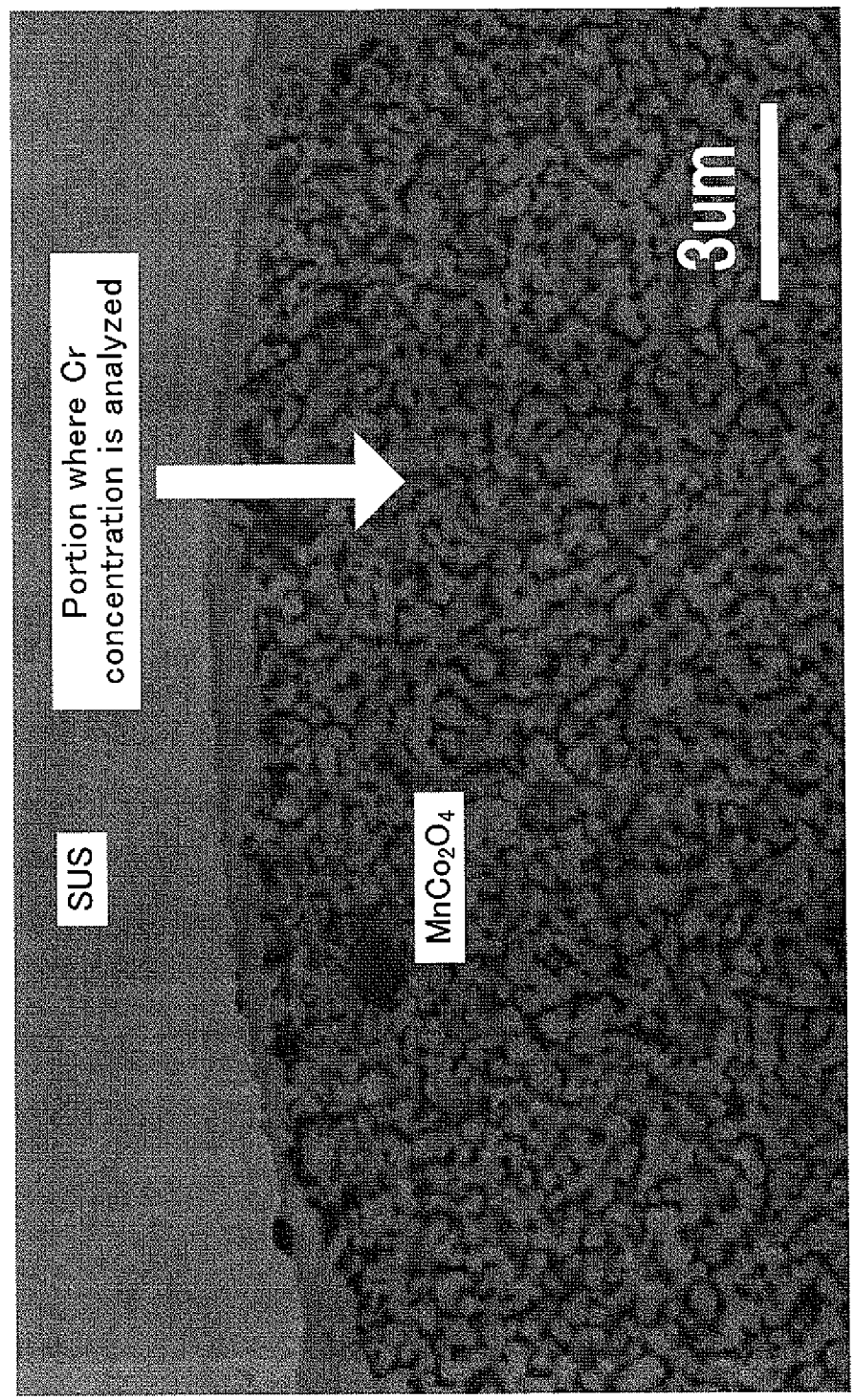
FIG. 18 is a diagram illustrating one example of an image of the cross-section of the vicinity of the boundary between the interconnector and the coating film in the coating member according to the comparative example as observed at a magnification of 2000 with an electron emission type analytical electron microscope.
Figure 19:
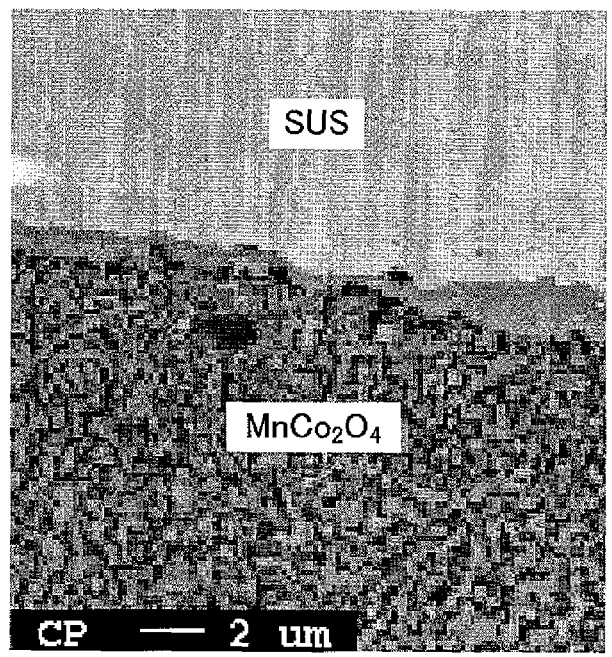
FIG. 19 is a partial image including the boundary in the image illustrated in FIG. 18.
Figure 20:
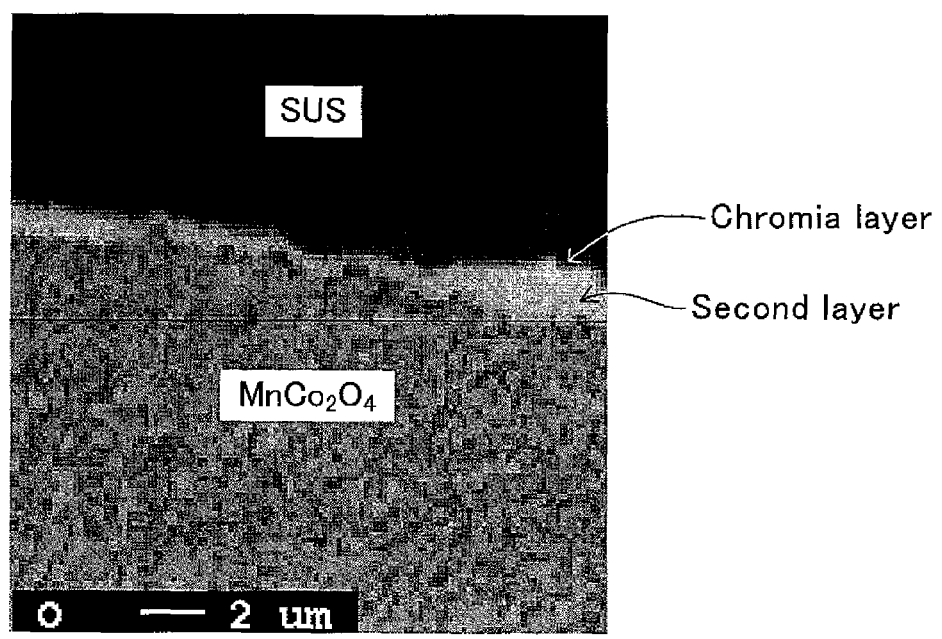
FIG. 20 is an image in which a mapping of oxygen is carried out for the portion corresponding to the image illustrated in FIG. 19.
Figure 21:
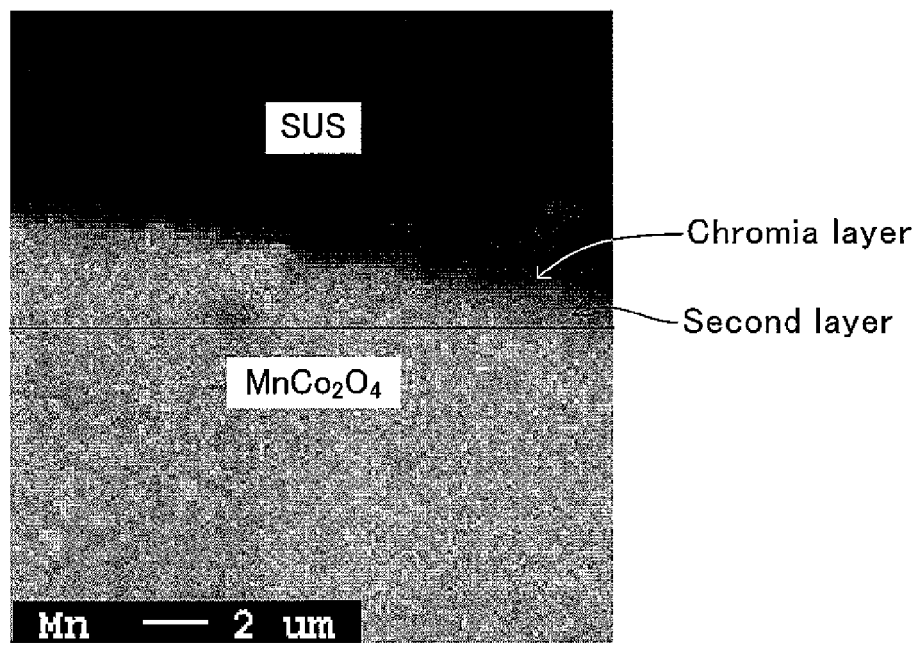
FIG. 21 is an image in which a mapping of manganese is carried out for the portion corresponding to the image illustrated in FIG. 19.
Figure 22:
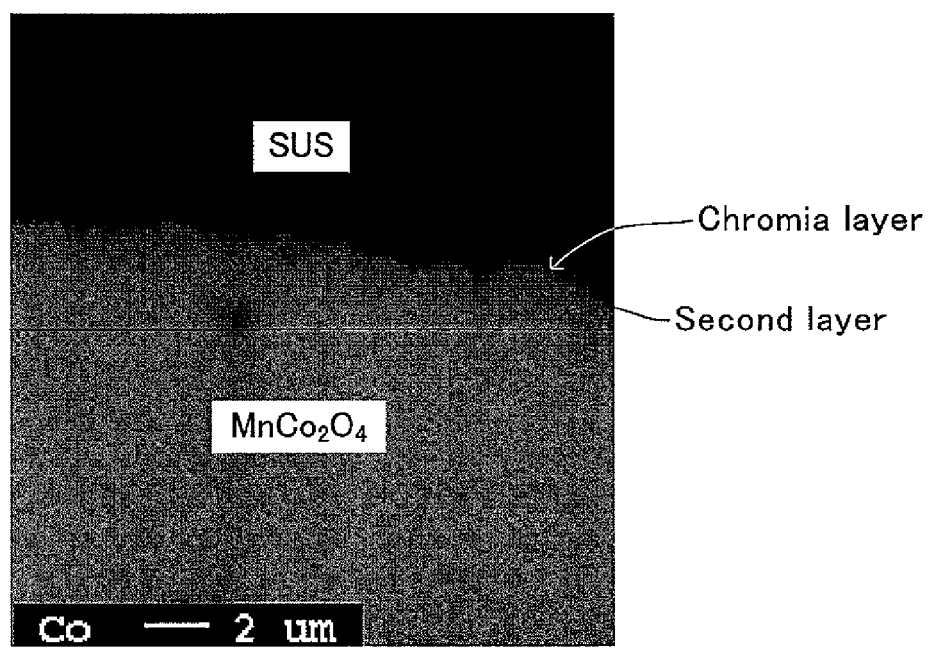
FIG. 22 is an image in which a mapping of cobalt is carried out for the portion corresponding to the image illustrated in FIG. 19.
Figure 23:
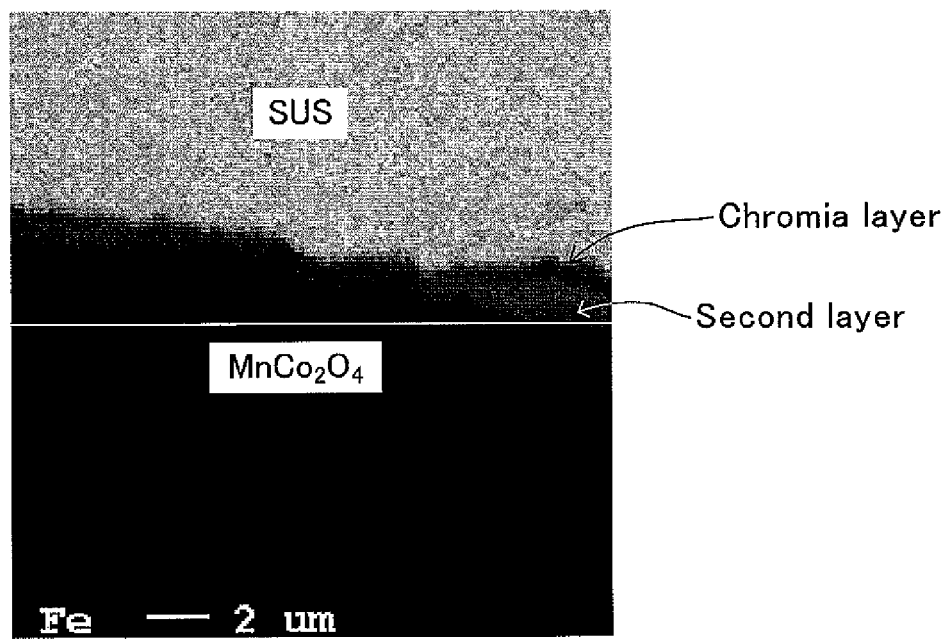
FIG. 23 is an image in which a mapping of iron is carried out for the portion corresponding to the image illustrated in FIG. 19.
Figure 24:
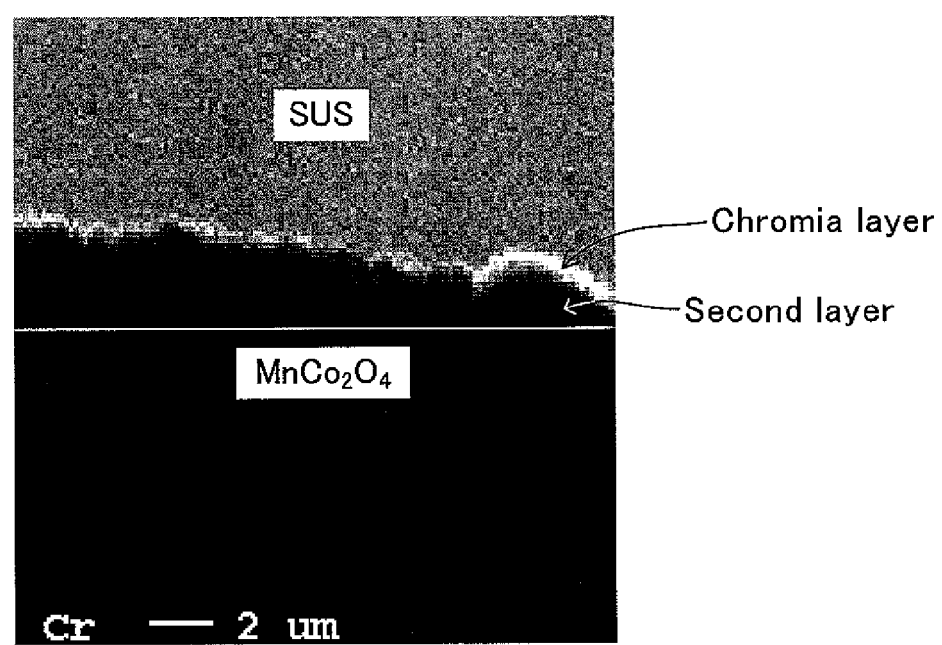
FIG. 24 is an image in which a mapping of chrome is carried out for the portion corresponding to the image illustrated in FIG. 19.

FIG. 18 is an example of an image of the cross-section of the vicinity of the boundary between the coating film and the interconnector in the coating body according to the comparative example as observed at a magnification of 2000 with an electron emission type analytical electron microscope. The elements contained in the boundary are analyzed. The result is described below. FIG. 19 is a partial image including the boundary in the image in FIG. 18. An element analysis (element mapping) is carried out for the portion corresponding to the image in FIG. 19. FIGS. 20 to 24 respectively illustrate the results of the mapping of O (oxygen), the mapping of Mn (manganese), the mapping of Co (cobalt), the mapping of Fe (iron), and the mapping of Cr (chrome). These images and analytical results are acquired with the use of a field-emission-type analytical microscope (JXA-8500F) made by JEOL Ltd, as in the above-mentioned embodiment.

As can be understood from FIGS. 20 to 24, two layers are interposed at the boundary between the coating film 210 and the interconnector 200. Of these two layers, the layer that is the closest to the interconnector 200 (the layer in contact with the interconnector 200) mainly contains Cr and O. Specifically, this layer can be said to be the layer containing a chromia ($Cr_2O_3$) (or the layer containing only a chromia). This layer corresponds to the "chromia layer" described above. The layer that is the closest to the coating film 210 (the layer in contact with the coating film 210) contains Mn, Co, Fe, and O (or contains only Mn, Co, Fe, and O). This layer corresponds to the "second layer" described above. Specifically, in the comparative example, the layer corresponding to the chromia layer and the layer corresponding to the "second layer" are respectively formed, but the layer corresponding to the first layer in the above-mentioned embodiment is not formed.

The thickness of the chromia layer is 1 to 5 µm, and the thickness of the second layer is 3 to 10 µm. The thickness of each layer is measured as in the above-mentioned embodiment.

Figure 25:
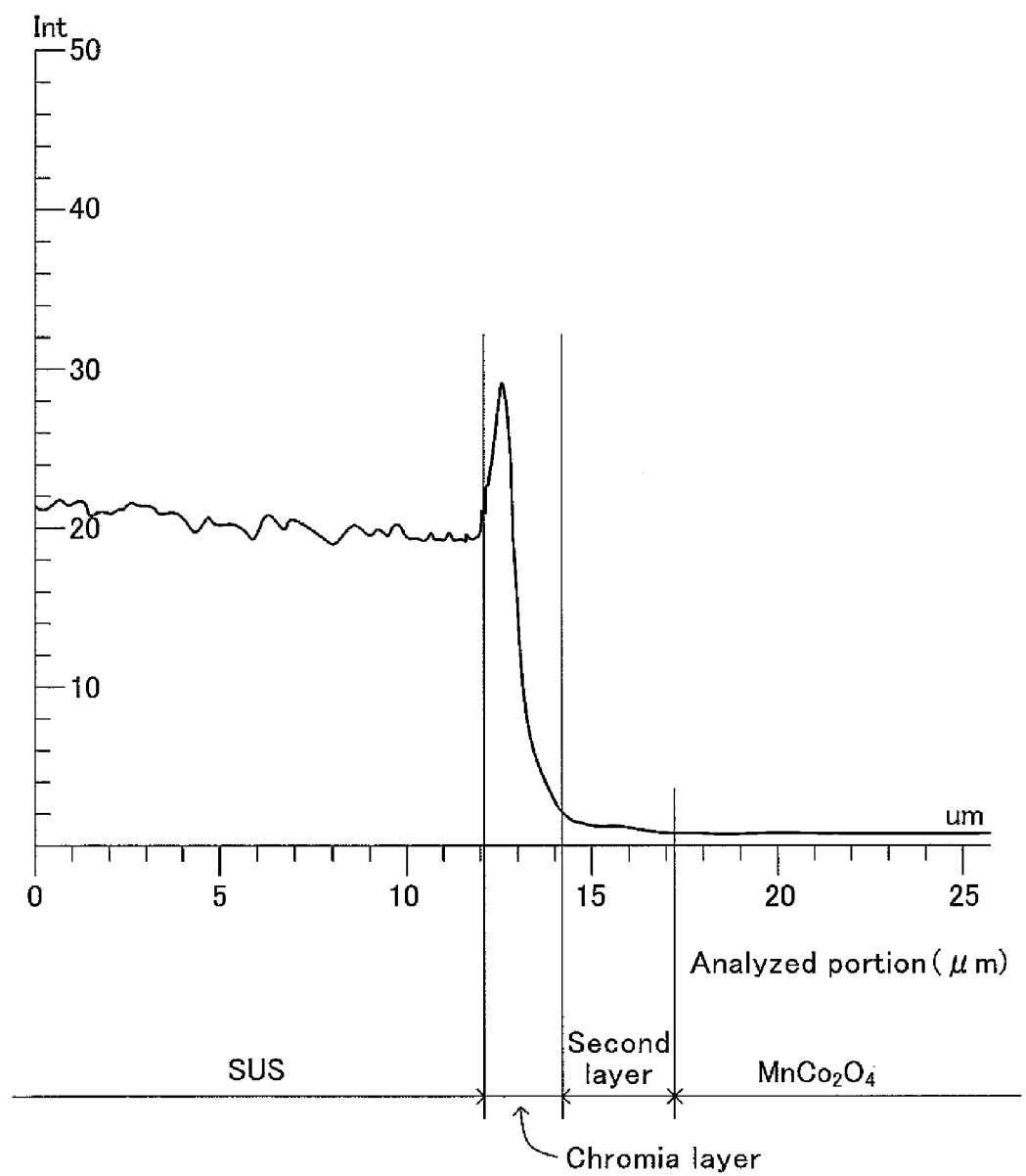
FIG. 25 is a graph illustrating a transition of Cr concentration in the thickness direction at the portion corresponding to the image illustrated in FIG. 19.

The Cr concentration in the chromia layer and the second layer in the comparative example is analyzed. FIG. 25 is a graph illustrating one example of the result of the element analysis for Cr and corresponding to FIG. 15. In the element analysis, the portion to be analyzed is scanned along the thickness direction from the interconnector 200 (SUS) toward the coating film ($MnCo_2O_4$) as indicated by a white arrow in FIG. 18. In FIG. 25, one example of the result illustrated in FIG. 15 is indicated by a broken line. This analytical result is also acquired with the use of a field-emission-type analytical microscope (JXA-8500F) made by JEOL Ltd.

As can be understood from FIG. 25, the maximum value of the Cr concentration in the chromia layer is greater than the Cr concentration in the interconnector 200 as in the above-mentioned embodiment. Specifically, the maximum value of the Cr concentration in the chromia layer falls within the range 1.2 to 2.5 times the average value of the Cr concentration in the interconnector 200. The maximum value of the Cr concentration in the second layer is sufficiently smaller than the average value of the Cr concentration in the interconnector 200 (including zero).

<Evaluation of Durability to Thermal Cycle Test>

The present inventor has found that the coating film in the coating body according to the present embodiment has more excellent durability to a thermal cycle test (found that the coating film is more difficult to be peeled) than the coating body according to the comparative example. The thermal cycle test is a test in which an atmospheric temperature is forcibly varied with a predetermined pattern. A test for confirming this finding will be described below.

In this test, plural samples, each of which had a different combination of the material of the coating film, the average diameter of the powder that was the starting material of the coating film, and the sintering temperature (heat-treatment temperature) during the formation of the coating film, were prepared for the coating body according to the present embodiment and the coating body according to the comparative example, respectively. Specifically, 18 types of standards (combinations) were prepared as illustrated in Table 1. 5 samples were prepared for the respective standards. In Table 1, those (standards 1 to 8, 12 to 15) in which the starting material is the powders (metal powders) of the respective metal elements constituting the spinel type material correspond to the present embodiment, while those (standards 9 to 11, 16 to 18) in which the starting material is the powder (ceramic powder) of the spinel type material that is synthesized beforehand correspond to the comparative example.

TABLE 1

| Standard | Coating film | Starting material | Average diameter (μm) | Heat-treatment temperature (° C.) |
|---|---|---|---|---|
| 1 | $MnCo_2O_4$ | Metal powder | 2 | 800 |
| 2 | $MnCo_2O_4$ | Metal powder | 5 | 800 |
| 3 | $MnCo_2O_4$ | Metal powder | 12 | 800 |
| 4 | $MnCo_2O_4$ | Metal powder | 20 | 800 |
| 5 | $MnCo_2O_4$ | Metal powder | 2 | 850 |
| 6 | $MnCo_2O_4$ | Metal powder | 5 | 850 |
| 7 | $MnCo_2O_4$ | Metal powder | 12 | 850 |
| 8 | $MnCo_2O_4$ | Metal powder | 20 | 850 |
| 9 | $MnCo_2O_4$ | Ceramic powder | 0.5 | 1000 |
| 10 | $MnCo_2O_4$ | Ceramic powder | 0.8 | 1100 |
| 11 | $MnCo_2O_4$ | Ceramic powder | 1 | 1200 |
| 12 | $CuMn_2O_4$ | Metal powder | 2 | 800 |
| 13 | $CuMn_2O_4$ | Metal powder | 5 | 800 |
| 14 | $CuMn_2O_4$ | Metal powder | 2 | 850 |
| 15 | $CuMn_2O_4$ | Metal powder | 5 | 850 |
| 16 | $CuMn_2O_4$ | Ceramic powder | 0.5 | 1000 |
| 17 | $CuMn_2O_4$ | Ceramic powder | 0.8 | 1100 |
| 18 | $CuMn_2O_4$ | Ceramic powder | 1 | 1200 |

Figure 26:
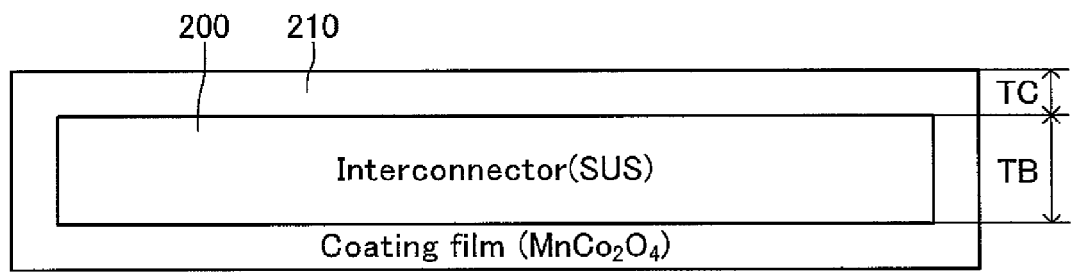
FIG. 26 is a schematic diagram illustrating the configuration of a sample for an evaluation of durability to a thermal cycle test.

As illustrated in FIG. 26, in these samples, a single interconnector 200, which has the plate-like shape same as that of the cell 100 as viewed from the top, is covered by the coating film all over the surface. In these samples, the thickness TC of the coating film is 50 μm, and the thickness TB of the interconnector 200 is 450 μm, those of which are constant. The shape of each of the samples viewed from the top is a circle having a diameter of 5 cm.

These samples were subject to a thermal cycle test. In the thermal cycle test, a pattern (1 cycle) in which "the atmospheric temperature was raised from room temperature to 750° C. for 30 minutes, and then, lowered from 750° C. to room temperature for 30 minutes" in air was repeated 100 times. After the thermal cycle test was completed, whether the coating film of each sample was peeled or not was confirmed. This confirmation was made visually and with the use of an optical microscope. Table 2 shows the result.

TABLE 2

| Standard | Evaluation result |
|---|---|
| 1 | No peel |
| 2 | No peel |
| 3 | No peel |
| 4 | No peel |
| 5 | No peel |
| 6 | No peel |
| 7 | No peel |
| 8 | No peel |
| 9 | Peeled |
| 10 | Peeled |
| 11 | Peeled (partially) |
| 12 | No peel |
| 13 | No peel |
| 14 | No peel |
| 15 | No peel |
| 16 | Peeled |
| 17 | Peeled |
| 18 | Peeled (partially) |

As can be understood from Table 2, the coating film in the coating body according to the present embodiment has more excellent durability to the thermal cycle test than the coating film in the coating body according to the comparative example.

<Evaluation of Cr Diffusion Amount>

The present inventor has confirmed that there is no great difference in the Cr diffusion amount between the coating body according to the comparative example and the coating body according to the present embodiment. A test for confirming this will be described below.

Figure 27:
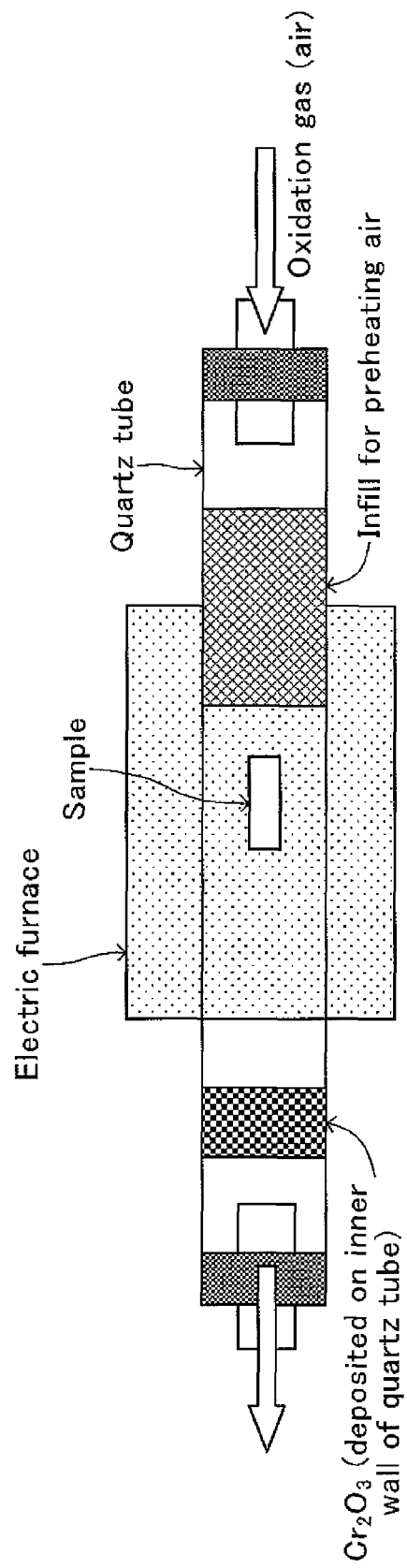
FIG. 27 is a schematic diagram illustrating a test apparatus used for the evaluation of the Cr diffusion amount.

In this test, a tubular electric furnace made of a quartz tube was used as a test apparatus as illustrated in FIG. 27. The sample (test piece) was stored in the tubular electric furnace, and with this state, oxidation gas (humidified air, humidifying temperature was 10° C.) whose flow rate was controlled by a mass flow controller was fed from the upstream side of the quartz tube.

Thus, the sample was exposed to a high-temperature oxidation atmosphere. The composition diffused as the vapor of the Cr due to the above-mentioned "Cr diffusion" was condensed as $Cr_2O_3$ at the outside of the electric furnace (at the downstream side of the quartz tube), whereby the condensed $Cr_2O_3$ was deposited on the inner wall of the quartz tube. After the completion of the test, $Cr_2O_3$ deposited on the inner wall of the quartz tube was eluted and collected, and the Cr diffusion amount was calculated based upon the weight of the collected $Cr_2O_3$.

The flow rate of the oxidation gas was set to be 300 sccm. This is based upon the fact that it is found from the preliminary study that the Cr diffusion amount tends to be different depending upon the flow rate of the oxidation gas and that the flow rate of the oxidation gas needed to a rate-controlling of the "Cr diffusion" in a reaction system in the test apparatus in the present embodiment is 300 sccm or more. The unit "sccm" is "cc/min" in a normal state (atmospheric pressure, 25° C.).

A plate member that was made of ZMG232L (commercial name) described above, had a thickness of 1 mm, and had a square planar shape with one side of 10 mm was used as the sample. Specifically, the surface area of the sample was 240 $mm^2$. Those having no coating film and those having the coating film made of $MnCo_2O_4$ of 18 standards illustrated in Table 1 (standards 1 to 8 correspond to the present embodiment, and the standards 9 to 11 correspond to the comparative example) were prepared. 5 samples for each standard were formed and evaluated.

Figure 28:
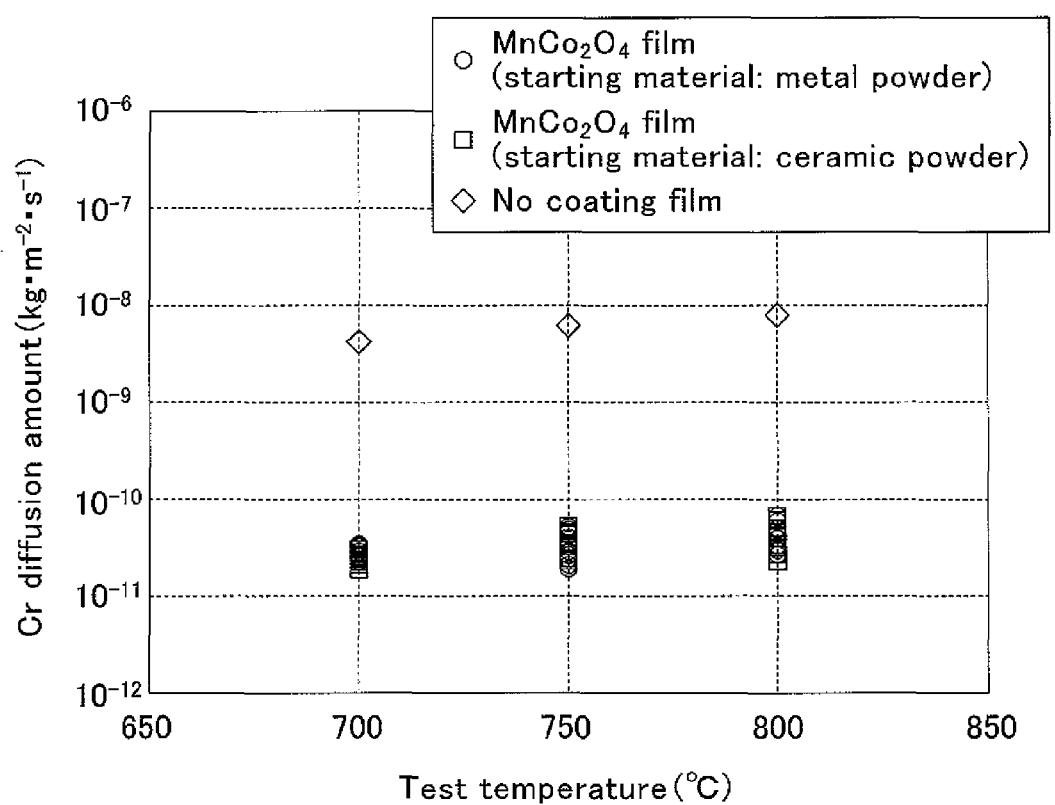
FIG. 28 is a graph illustrating the evaluation result of the Cr diffusion amount.

3 levels of test temperature, which were 700, 750, and 800° C., were set, and the retaining time was set to be 1000 hours. As the Cr diffusion amount, the formation speed of $Cr_2O_3$, i.e., the weight (unit: $Kg \cdot m^{-2} \cdot s^{-1}$) formed per a unit time and per a unit area was employed. FIG. 28 illustrates the evaluation result. In FIG. 28, the average value of the Cr diffusion amount was illustrated for each test temperature and each standard.

As can be understood from FIG. 28, the Cr diffusion amount is remarkably reduced in those having formed thereon the coating film made of $MnCo_2O_4$ than those having no coating film. On the other hand, it can be said that there is no great difference in the Cr diffusion amount between the coating body (starting material: ceramic powder) according to the comparative example and the coating body (starting material: metal powder) according to the present embodiment.

As described above, in the coating body according to the present embodiment, which uses the coating film formed by using powders of the respective metal elements (Mn, Co) constituting the spinel type material ($MnCo_2O_4$, etc.) as a starting material, the durability of the coating film to the thermal cycle test is enhanced without increasing the Cr diffusion amount, compared to the coating body according to the comparative example, which uses the coating film formed by using powders of spinel type material ($MnCo_2O_4$) synthesized beforehand as the starting material. Specifically, according to the coating body of the present embodiment, the paste is sufficiently densified even if the sintering temperature is set to be relatively low (e.g., 700 to 900° C.). Accordingly, the coating member in which the coating film is difficult to be peeled even if the coating body is placed in a severe temperature change can be obtained.

What is claimed is:

1. A coating body comprising:
    a conductive member made of a metal material containing Fe and Cr;
    a coating film that is formed to include a transition metal oxide having a spinel type crystal structure represented by a chemical formula $AB_2O_4$, wherein A is at least one type of metal element selected from Mn and Cu, B is at least one type of metal element selected from Co and Mn, and that covers the surface of the conductive member, and spherical particles in which plural crystal faces are exposed to the surface, each of the spherical particles having a side with a length of 1 µm or more, among the plural sides constituting an outline of the crystal face,
    wherein a first layer having a thickness of 1 to 7 µm and containing elements of A, B, Fe, Cr, and O is interposed at the boundary between the coating film and the conductive member, wherein the Cr concentration in the first layer falls within the range 0.1 to 0.5 times the average value of the Cr concentration in the conductive member, and
    wherein a diameter of the particles is 5 to 80 µm.

2. A coating body according to claim 1, wherein a chromia layer having a thickness of 1 to 5 µm and containing $Cr_2O_3$ is interposed at the boundary at the side closer to the conductive member than the first layer, wherein the maximum value of the Cr concentration in the chromia layer falls within the range 1.5 to 4 times the average value of the Cr concentration in the conductive member.

3. A coating body according to claim 1, wherein a second layer having a thickness of 3 to 10 µm and containing elements of A, B, Fe, and O is interposed at the boundary at the side closer to the coating film than the first layer, wherein the maximum value of the Cr concentration in the second layer is smaller than the minimum value of the Cr concentration in the first layer.

4. A coating body according to claim 1, wherein the coating film is formed by sintering a paste, which contains a mixture of powders of A and B elements, with the paste being formed on the surface of the conductive member.

5. A coating body according to claim 1, wherein the coating film includes a noble metal in addition to the transition metal oxide.

6. A coating body according to claim 1, wherein the conductive member is an interconnector that electrically connects an external conductive member and an air electrode in a cell of a solid oxide fuel cell that includes a solid electrolyte, a fuel electrode, which is arranged integral with the solid electrolyte and allows a fuel gas to react through the contact with the fuel gas, and the air electrode, which is arranged integral with the solid electrolyte and allows a gas containing oxygen to react through the contact with the gas containing oxygen.

7. The coating body according to claim 1, wherein the coating body has a three-dimensional network structure in which many base portions from which two or more arm portions extend are three-dimensionally arranged, and the arm portions extending from different base portions are three-dimensionally connected to each other so as to allow many base portions to be connected to one another through the arm portions in a network form, a thickness of the arm portion that links many base portions to one another is 0.3 to 2.5 µm, and the particles are contained in the three-dimensional structure.

* * * * *